(12) United States Patent
Honda et al.

(10) Patent No.: US 7,952,279 B2
(45) Date of Patent: May 31, 2011

(54) LIGHT EMITTING DISPLAY DEVICE, PLASMA DISPLAY DEVICE AND PHOSPHOR PARTICLES

(75) Inventors: Yosuke Honda, Osaka (JP); Iwao Ueno, Kyoto (JP); Seiji Nishiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 12/529,063

(22) PCT Filed: Feb. 29, 2008

(86) PCT No.: PCT/JP2008/000409
§ 371 (c)(1),
(2), (4) Date: Aug. 28, 2009

(87) PCT Pub. No.: WO2008/120441
PCT Pub. Date: Oct. 9, 2008

(65) Prior Publication Data
US 2010/0026164 A1 Feb. 4, 2010

(30) Foreign Application Priority Data

Mar. 1, 2007 (JP) .................................. 2007-051000
Jan. 9, 2008 (JP) .................................. 2008-002497

(51) Int. Cl.
*H01J 17/49* (2006.01)
(52) U.S. Cl. ........ 313/582; 313/484; 313/503; 313/467; 427/64; 252/301.4 R; 252/301.6 R; 252/301.4 H
(58) Field of Classification Search .......... 313/582–587, 313/467, 486, 496, 503, 504; 252/301.4 R, 252/301.4 P, 301.4 H, 301.6 P, 301.6 R; 427/64, 68, 71, 443.2
See application file for complete search history.

(56) References Cited

U.S. PATENT DOCUMENTS

| 6,099,753 | A | 8/2000 | Yoshimura et al. |
| 6,673,269 | B2 | 1/2004 | Suzuki et al. |
| 2001/0024084 | A1 | 9/2001 | Kajiwara |
| 2004/0043692 | A1 | 3/2004 | Kawamura et al. |
| 2004/0183439 | A1 | 9/2004 | Aoki et al. |
| 2005/0017218 | A1 | 1/2005 | Zukawa et al. |
| 2005/0040765 | A1* | 2/2005 | Okumura et al. ............. 313/582 |

(Continued)

FOREIGN PATENT DOCUMENTS
JP 10-125240 5/1998
(Continued)

OTHER PUBLICATIONS

International Search Report for corresponding application No. PCT/JP2008/000409 mailed Jun. 10, 2008.

(Continued)

*Primary Examiner* — Joseph L Williams
*Assistant Examiner* — Kevin Quarterman
(74) *Attorney, Agent, or Firm* — Renner, Otto, Boisselle & Sklar, LLP

(57) ABSTRACT

A fluorescence particle 17 according to the present invention is used for a light emitting display device and is made of a fluorescent material. The fluorescent material has at least one element 18 selected from the group consisting of Al, Mg, Ca, Ba, Sr and Y. Within a range 17a from the surface 17s of the fluorescence particle through a depth of 20 nm, the at least one element 18 has a local maximum of its concentration profile in the depth direction.

15 Claims, 16 Drawing Sheets

U.S. PATENT DOCUMENTS

| | | | |
|---|---|---|---|
| 2005/0062417 A1 | 3/2005 | Okuyama et al. | |
| 2005/0140271 A1* | 6/2005 | Ikada et al. | 313/503 |
| 2005/0174037 A1* | 8/2005 | Ueno et al. | 313/486 |
| 2005/0214569 A1* | 9/2005 | Fujimoto et al. | 428/690 |
| 2005/0277570 A1 | 12/2005 | Zukawa et al. | |

FOREIGN PATENT DOCUMENTS

| | | |
|---|---|---|
| JP | 10-195428 | 7/1998 |
| JP | 11-172244 | 6/1999 |
| JP | 2001-055567 | 2/2001 |
| JP | 2001-234163 | 8/2001 |
| JP | 2002-226851 | 8/2002 |
| JP | 2003-082343 | 3/2003 |
| JP | 2003-147354 | 5/2003 |
| JP | 2005-023317 | 1/2005 |
| JP | 2005-100891 | 4/2005 |
| JP | 2005-340155 | 12/2005 |
| JP | 2006-236961 | 9/2006 |
| WO | 2004/031323 | 4/2004 |

OTHER PUBLICATIONS

International Preliminary Report on Patentability corresponding application No. PCT/JP2008/000409 dated Apr. 21, 2009.

Technical Report No. 830 of the Institute of Electrical Engineers of Japan, May 2001, pp. 30-39.

NHK R & D, No. 93, Sep. 2005.

* cited by examiner (a)

(b)

LIGHT EMITTING DISPLAY DEVICE, PLASMA DISPLAY DEVICE AND PHOSPHOR PARTICLES

TECHNICAL FIELD

The present invention relates to a light emitting display device such as a plasma display panel for use to present an image on a TV, for example, and also relates to a fluorescence particle for use in such a device.

BACKGROUND ART

In recent years, there is a growing demand for high-definition TVs with high image quality and a big screen. A plasma display panel (PDP) not only has these advantageous features but also is thin and lightweight as well. For that reason, plasma TV sets that use a plasma display panel have attracted a lot of attention these days.

A plasma display panel conducts a display operation in full colors by adding together the so-called "three primary colors". To get such a full-color display operation done, a fluorescence layer that emits radiations in red (R), green (G) and blue (B) is provided in the barrier rib of a PDP. The fluorescence particles that form the fluorescence layer are excited by an Xe resonance beam with a center wavelength of 147 nm, which has been produced in the electrical discharge cell of the plasma display panel, or a vacuum ultraviolet ray produced by a molecular beam with a center wavelength of 172 nm, thus producing visible radiations in red, green and blue.

A plasma display panel produces an ultraviolet ray by confining plasma in its electrical discharge cell. For that reason, the fluorescence layer is exposed to the plasma and cations in the plasma will collide against the fluorescence particles, thus deteriorating the fluorescence particles. Non-Patent Document No. 1 and Patent Documents Nos. 1 to 4 teach a technique for reducing such deterioration of a fluorescence particle by protecting the surface of the fluorescence particle with a coating of a metal oxide such as aluminum oxide or magnesium oxide.

Patent Document No. 1: Japanese Patent Application Laid-Open Publication No. 10-125240
Patent Document No. 2: Japanese Patent Application Laid-Open Publication No. 11-172244
Patent Document No. 3: Japanese Patent Application Laid-Open Publication No. 2001-55567
Patent Document No. 1: Japanese Patent Application Laid-Open Publication No. 10-195428
Non-Patent Document No. 1: Technical Report No. 830 of the Institute of Electrical Engineers of Japan, May 2001, pp. 30-39
Non-Patent Document No. 2: NHK R & D, No. 93, September 2005

DISCLOSURE OF INVENTION

Problems to be Solved by the Invention

As high-definition TV programs have become more and more popular these days, there has been a growing demand for full-spec high-definition display devices with a resolution of 1,920 horizontal pixels by 1,080 vertical pixels. A full-spec high-definition display device has six times as large a number of pixels as a conventional NTSC display device with a resolution of 852 horizontal pixels by 480 vertical pixels and has 2.25 times as large a number of display and address electrodes as the conventional NTSC display device. That is why in a full-spec high-definition plasma display panel, the area of its emission cell per inch becomes as small as approximately one-sixth of each cell of the conventional NTSC display device and the number of its electrodes is also 2.25 times as large as that of the conventional device.

For these reasons, to realize a full-spec high-definition plasma display panel, the luminous efficacy of each cell thereof should be increased. For that purpose, in a conventional full-spec high-definition plasma display panel, the interval between the barrier ribs that form a cell is narrowed, thereby reducing the area of the barrier ribs that are non-emissive regions. For example, in a 42-inch full-spec high-definition plasma display panel, each pixel has a size of 0.48 mm, and the barrier rib that separates the cells in respective colors from each other has a thickness of approximately 0.16 mm.

Meanwhile, to avoid a decrease in luminous efficacy due to the reduction of the cell size, the density of the Xe gas, which is used as an electrical discharge gas, is increased. For example, in a mixture of Ne and Xe gases, the partial pressure of the Xe gas is increased to 15% or more.

If such a structure were adopted, however, the electrical discharge space would shrink with a reduction in cell size, and electrons, produced as a result of the electrical discharge, would drift toward the barrier ribs and disappear. That is why to achieve as high a luminance as a conventional panel, a higher electrical discharge voltage should be applied, thus increasing the power dissipation and decreasing the luminance efficiency, which are problems with a different phase from the conventional one. On top of that, as the electrical discharge voltage rises, the impact of ions colliding against the fluorescence particle would increase, thus further decreasing the luminance of the panel, which is also a problem (see Non-Patent Documents Nos. 1 and 2).

According to none of the techniques disclosed in Non-Patent Document No. 1 and Patent Documents Nos. 1 to 4, these problems cannot be overcome fully. And such problems will be commonly encountered in not just plasma display panels but also any other light emitting display device (such as a field emission display device) for presenting an image using a fluorescence.

In order to overcome the problems described above, the present invention has an object of providing a fluorescence particle, a plasma display panel, and a light emitting display device that will not cause such a decrease in luminance.

Means for Solving the Problems

The present invention provides a fluorescence particle for a light emitting display device. The particle is made of a fluorescent material. The fluorescent material has at least one element selected from the group consisting of Al, Mg, Ca, Ba, Sr and Y. Within a range from the surface of the fluorescence particle through a depth of 20 nm, the at least one element has a local maximum of its concentration profile in the depth direction.

In one preferred embodiment, the average concentration of the at least one element within the range from the surface of the fluorescence particle through the depth of 20 nm is at least higher than, but at most three times as high as, its average concentration over the entire fluorescence particle.

In this particular preferred embodiment, every constituent element of the fluorescent material but the at least one element is distributed substantially uniformly in the fluorescence particle.

In a specific preferred embodiment, the average concentration of the at least one element in the range from the surface of the fluorescence particle through the depth of 20 nm has been increased by diffusing the at least one element inward from the surface of the fluorescence particle.

In still another preferred embodiment, the fluorescent material includes at least one of (Ba, Sr)MgAl$_{10}$O$_{17}$: Eu, SrMg(SiO$_2$): Eu, Sr$_2$MgSi$_2$O$_7$: Eu, CaMgSi$_2$O$_6$: Eu and SrMgSi$_2$O$_6$: Eu.

In yet another preferred embodiment, the fluorescent material includes at least one of (Y, Gd)BO$_3$: Tb, LaPO$_4$: Ce, Tb, BaMg$_2$Al$_{14}$O$_{24}$: Eu, Mn, BaAl$_{12}$O$_{19}$: Mn, and Zn$_2$SiO$_4$: Mn.

In yet another preferred embodiment, the fluorescent material includes at least one of Y(P, V)O$_4$: Eu, Y$_2$O$_3$: Eu, (Y, Gd)$_2$O$_3$: Eu, and (Y, Gd)BO$_3$: Eu.

A plasma display panel according to the present invention includes: a front panel, which includes a transparent substrate and display electrodes that are arranged in stripes on the transparent substrate; and a rear panel, which includes a supporting substrate, address electrodes that are arranged in stripes on the supporting substrate, a number of barrier ribs that are arranged on the supporting substrate to be located at least between the address electrodes, and a fluorescence layer that is arranged so as to cover the address electrodes between the barrier ribs. The front and rear panels are arranged to face each other such that the address electrodes and the display electrodes cross each other substantially at right angles and an electrical discharge gas is confined within a space between the barrier ribs. The fluorescence layer includes a light emitting display device fluorescence particle according to any of the preferred embodiments of the present invention described above.

In one preferred embodiment, in the fluorescence layer, the surface of the light emitting display device fluorescence particle is exposed.

In another preferred embodiment, the electrical discharge gas includes at least 15 vol % of xenon gas.

A light emitting display device according to the present invention includes: an excitation source that emits an electromagnetic wave or an electron beam with a shorter wavelength than visible radiation; and a light emitting display device fluorescence particle according to any of the preferred embodiments of the present invention described above, which is arranged so as to be irradiated with the electromagnetic wave or the electron beam.

A method of making a light emitting display device fluorescence particle according to the present invention includes the steps of: preparing a fluorescence particle made of a fluorescent material; (A) immersing the fluorescence particle in a solution that has a non-water-soluble organometallic compound, including at least one element selected from the group consisting of Al, Mg, Ca, Ba, Sr and Y, and a non-aqueous solvent; (B) removing the non-aqueous solvent to obtain a fluorescence particle that has had the non-water-soluble organometallic compound deposited thereon; and (C) thermally treating the fluorescence particle on which the non-water-soluble organometallic compound has been deposited.

In one preferred embodiment, the non-water-soluble organometallic compound is at least one compound selected from the group consisting of metal salts of aliphatic acid, metal salts of acetylacetone, metal salts of unsaturated carboxylic acid, metallocene compounds, and β-diketone.

In another preferred embodiment, the step (C) includes heating the fluorescence particle, on which the non-water-soluble organometallic compound has been deposited, to a temperature of 500° C. to 650° C.

In still another preferred embodiment, the fluorescent material includes at least one of (Ba, Sr)MgAl$_{10}$O$_{17}$: Eu, SrMg(SiO$_2$): Eu, Sr$_2$MgSi$_2$O$_7$: Eu, CaMgSi$_2$O$_6$: Eu and SrMgSi$_2$O$_6$: Eu.

In yet another preferred embodiment, the fluorescent material includes at least one of (Y, Gd)BO$_3$: Tb, LaPO$_4$: Ce, Tb, BaMg$_2$Al$_{14}$O$_{24}$: Eu, Mn, BaAl$_{12}$O$_{19}$: Mn, and Zn$_2$SiO$_4$: Mn.

In yet another preferred embodiment, the fluorescent material includes at least one of Y(P, V)O$_4$: Eu, Y$_2$O$_3$: Eu, (Y, Gd)$_2$O$_3$: Eu, and (Y, Gd)BO$_3$: Eu.

Effects of the Invention

According to the present invention, in the reformed layer of a fluorescence particle, which covers the range from the surface of the fluorescence particle through a depth of 20 nm, at least one element selected from the group consisting of Al, Mg, Ca, Ba, Sr and Y has a local maximum in the concentration profile in the depth direction. Thus, the number of ion defects and lattice defects can be reduced in the vicinity of the surface of the fluorescence particle, and therefore, the fluorescence particle can withstand the ion bombardment so well that its crystal structure is hardly affected. As a result, the decrease in the luminance of the fluorescence particle can be minimized. In addition, at least one element selected from the group consisting of Al, Mg, Ca, Ba, Sr and Y forms an ion bond with oxygen in the reformed layer, and is likely to emit electrons. As a result, the loss of electrons that have drifted due to the decrease in electrical discharge voltage or the interval between the barrier ribs can be compensated for, and the luminance can be increased. Consequently, the present invention provides a high-definition plasma display panel that can minimize the decrease in the luminance of the fluorescence while the panel is being driven, will never cause any color unevenness or image persistence, and will have a significantly extended life while dissipating much less power.

Figure 1:
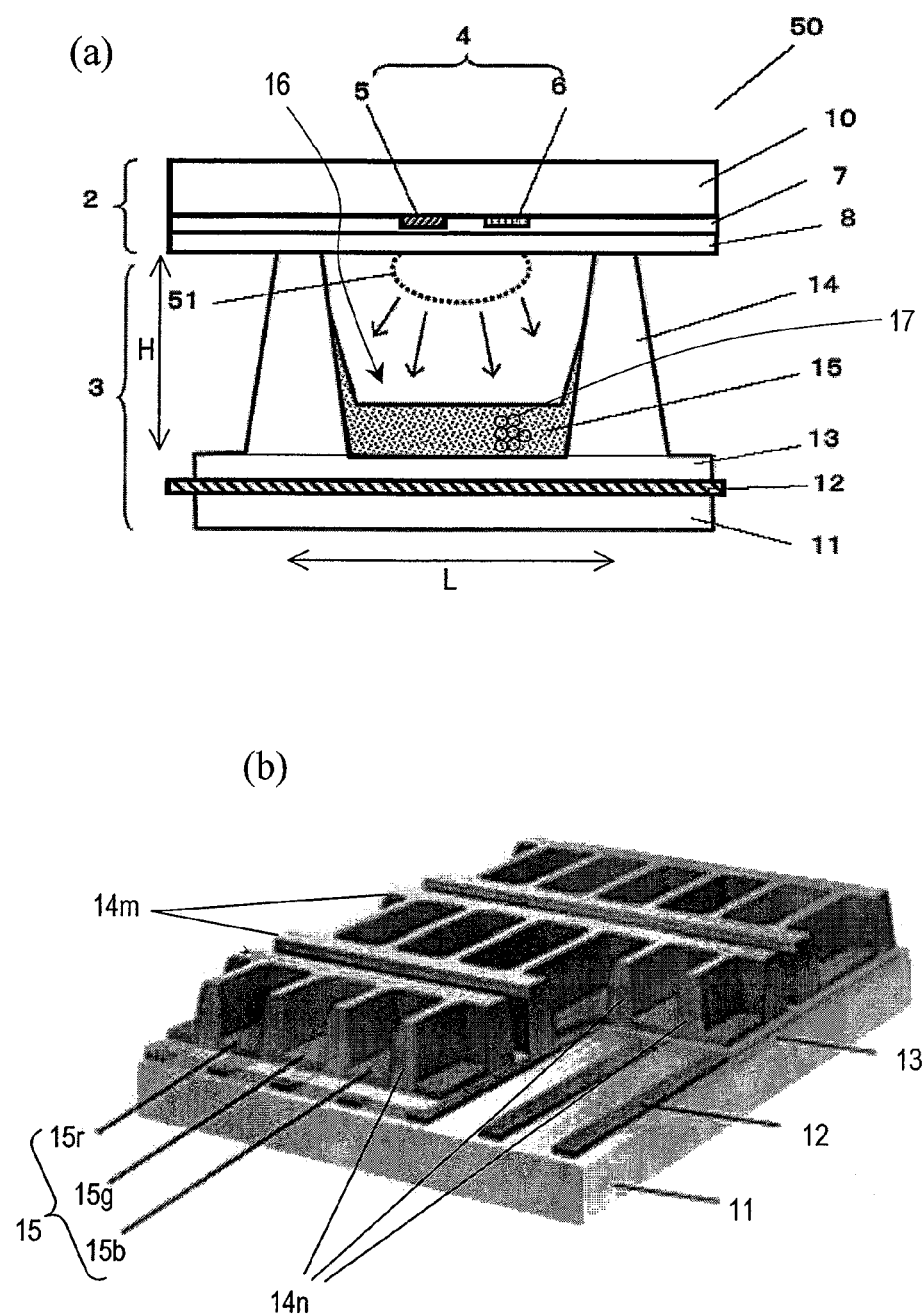
FIG. 1(a) is a diagrammatic cross-sectional view illustrating the structure of an electrical discharge cell in a plasma display panel according to the present invention.
FIG. 1(b) is a perspective view partly in section illustrating its rear panel.

DESCRIPTION OF REFERENCE NUMERALS 2 front panel
3 rear panel
4 display electrode
5 scan electrode
6 sustain electrode
7 dielectric layer
8 protective coating
10 transparent substrate
11 supporting substrate
12 address electrode
13 dielectric layer
14 barrier rib
15 fluorescence layer
16 electrical discharge cell
17 fluorescence particle
17s surface of the fluorescence particle
17a region around the surface of the fluorescence particle
17b internal region of the fluorescence particle
18 diffused element
50 plasma display panel
51 electrical discharge for display
D depth (or distance) from the surface 17S of the fluorescence particle
H height of the barrier rib 14
L interval between the barrier ribs 14
S10 step of preparing fluorescence particles
S11 step of immersing the fluorescence particles in solution including organometallic compound
S12 step of removing organic solvent
S13 heat treatment process step

BEST MODE FOR CARRYING OUT THE INVENTION

According to a conventional technique for reducing the deterioration of a fluorescence particle, the surface of the fluorescence particle is covered with a protective coating of MgO or $Al_2O_3$, thereby preventing cation particles from directly colliding against the fluorescence particle.

However, such a protective coating needs to not only transmit an electron beam such as an ultraviolet ray that will cause the fluorescence particle to produce fluorescenceescence but also transmit visible radiation, which has been transformed from the fluorescenceescence produced internally by the fluorescence particle, outward.

That is why if the protective coating were too thick, then the ultraviolet ray or visible radiation could not be transmitted sufficiently, thus causing a decrease in luminous efficacy. On the other hand, if the protective coating were too thin, then it would be impossible to prevent the fluorescence particle from deteriorating due to the collision of cation particles and the protective coating might also peel off. That is to say, according to the conventional method for reducing the deterioration of a fluorescence particle, a tradeoff is inevitable between the reduction of deterioration and significant increase in luminous efficacy, and it is difficult to achieve a high luminous efficacy while reducing the deterioration of the fluorescence particle sufficiently.

To overcome these problems with the prior art, the fluorescence particle does not have its surface covered with such a protective coating but has its surface portion reformed according to the present invention. In the reformed surface portion, the crystal defects have been repaired and the particle has had its degree of crystallinity increased. That is why even if ions collide against the surface portion of the fluorescence particle, its crystal structure will not collapse easily. On top of that, since the surface of the fluorescence particle is not covered with a different layer that never produces fluorescenceescence, the decrease in the fluorescenceescence at the surface of the fluorescence particle can be minimized. As a result, reduction of the deterioration of the fluorescence particle and significant increase in luminous efficacy, which have been difficult to achieve at the same time according to a conventional technique, are accomplished according to the present invention.

Hereinafter, preferred embodiments of a fluorescence particle and a light emitting display device according to the present invention will be described in detail. In the following description of preferred embodiments, a plasma display panel will be described as an exemplary light emitting display device according to the present invention. However, one of the major features of the present invention lies in the structure of a fluorescence particle that would have significantly reduced deterioration, and the present invention is applicable to fluorescence particles made of various fluorescent materials. And the present invention is also applicable to a fluorescence particle that produces fluorescenceescence in the visible range using an electromagnetic wave or an electron beam such as an ultraviolet ray or an X-ray, which has a shorter wavelength than visible radiation, as an excitation source. That is why the present invention is applicable for use in not just plasma display panels but also various kinds of field emission displays (FEDs) as well.

FIG. 1(a) is a cross-sectional view schematically illustrating an electrical discharge cell structure, which is an electrical discharge unit of a surface-emitting AC plasma display panel 50 as a preferred embodiment of a plasma display panel according to the present invention. As shown in FIG. 1(a), the plasma display panel 50 includes a front panel 2 and a rear panel 3.

The front panel 2 includes a transparent substrate 10 and a number of display electrodes 4 that are arranged on the transparent substrate 10, which preferably transmits visible radiation and may be a glass substrate, for example. The display electrodes 4 include scan electrodes 5 and sustain electrodes 6 that are arranged in stripes and are preferably made of a transparent conductive material such as ITO. Although not shown in FIG. 1, fine-line bus electrodes may be further arranged over the scan and sustain electrodes 5 and 6 to reduce the electrical resistance of these electrodes. And a dielectric layer 7 is preferably arranged on the surface of the transparent substrate 10 so as to cover the display electrodes 4 and a protective coating 8 of MgO, for example, is preferably further stacked on the dielectric layer 7.

FIG. 1(b) is a perspective view partly in section illustrating the rear panel 3. As shown in FIGS. 1(a) and 1(b), the rear panel 3 includes a supporting substrate 11, a number of address electrodes (which will also be referred to herein as "data electrodes") 12 arranged on the supporting substrate 11, barrier ribs 14, and a fluorescence layer 15 with fluorescence particles 17. The supporting substrate 11 may be a glass substrate, for example. On the supporting substrate 11, arranged in stripes are the address electrodes 12. A dielectric layer 13 may be deposited on the supporting substrate 11 so as to cover the address electrodes 12. The dielectric layer 13 may be made of low-melting glass, for example.

The barrier ribs 14 include a group of barrier ribs 14n that are arranged on the supporting substrate 11 so as to be located at least between the address electrodes 12. The barrier ribs 14n are not shown in FIG. 1(a) because the barrier ribs 14n are arranged parallel to the paper on which FIG. 1(a) is drawn. More preferably, the barrier ribs 14 further include another group of barrier ribs 14m that are arranged so as to cross the address electrodes 12 at right angles. And these two groups of barrier ribs 14n and 14m form a waffle rib structure (or well curb structure) that surrounds the electrical discharge cells. By adopting such a waffle rib structure, it is possible to prevent the fluorescenceescence produced in each cell from leaking into an adjacent cell.

The space defined by the barrier ribs 14 serves as an electrical discharge cell 16. Those electrical discharge cells 16 are arranged one-dimensionally along each of the address electrodes 12. The barrier ribs 14 are made of low-melting glass, may have a height H of approximately 120 μm, and may be arranged at an interval L of approximately 200 μm.

In each electrical discharge cell 16, the fluorescence layer 15 is arranged on the barrier ribs 14 and the dielectric layer 13 so as to cover its associated address electrode 12. As shown in FIG. 1(b), three portions 15r, 15g and 15b of the fluorescence layer 15 that emit fluorescenceescence in red (R), green (G) and blue (B), respectively, are arranged in three adjacent electrical discharge cells 16, which form a single pixel. The fluorescence layer 15 includes the fluorescence particles 17. To form the fluorescence layer 15 by a printing process, a binder or any other suitable additive may be included in the fluorescence layer 15. Even so, it is preferred that the additive such as a binder does not cover the fluorescence particles 17 entirely so that the fluorescence particles 17 are irradiated with an ultraviolet ray to produce fluorescenceescence. The structure of the fluorescence particles 17 will be described in detail later.

As shown in FIG. 1(a), the front and rear panels 2 and 3 are arranged so that the display electrodes 4 cross the address electrodes 12 at substantially right angles and that the barrier ribs 14 on the rear panel 3 contact with the protective coating 8 of the front panel 2, thereby sealing hermetically the space between the barrier ribs 14 and each electrical discharge cell 16. As a result, in each electrical discharge cell 16, the display electrodes 4 and the address electrode 12 face and cross each other at right angles.

In each electrical discharge cell 16, a gas including Xe (xenon) is confined as an electrical discharge gas. Specifically, a mixed rare gas such as a xenon-neon gas or a xenon-helium gas, including 15 vol % to 100 vol % of Xe, is preferably confined there at a pressure of approximately several tens kPa.

In the plasma display panel 50, first of all, a voltage is applied between the address electrode 12 and scan electrode 5 of a target electrical discharge cell 16 to turn ON, thereby producing electrical discharge for addressing. As a result, wall electrical charges get stored in that electrical discharge cell 16. Next, when a voltage is applied between the sustain electrode 6 and the scan electrode 5, an electrical discharge for display 51 is produced only in the electrical discharge cell 16 in which the wall electrical charges have been stored as a result of the electrical discharge for addressing. Due to the electrical discharge for display 51, Xe of the electrical discharge gas confined is excited to produce an ultraviolet ray, which then excites the fluorescence particles 17 of the fluorescence layer 15, thereby producing visible radiation in a predetermined color. Thus, by specifying one of the address electrodes 12 and one of the scan electrodes 5 in combination, any of the electrical discharge cells 16 that are arranged in matrix can be selected arbitrarily to produce fluorescenceescence.

Figure 2:
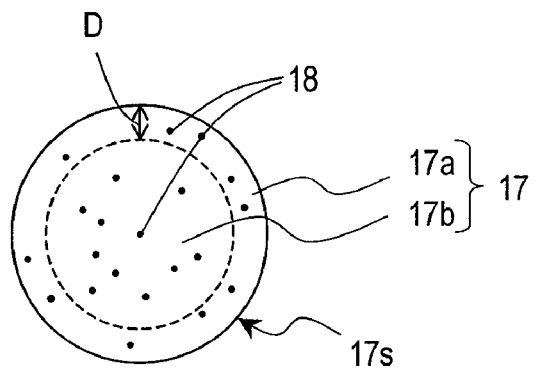
FIG. 2 is a schematic cross-sectional view illustrating the structure of a fluorescence particle according to the present invention.

Next, the structure of the fluorescence particle 17 will be described in detail. FIG. 2 schematically illustrates the cross-sectional structure of the fluorescence particle 17, which is made of a known fluorescent material and is either a single crystalline particle or a particle with a high degree of crystallinity. The shape of the particle is not particularly limited but could be determined according to the composition of the fluorescent material. For example, the fluorescence particle may have a spherical shape or a plate shape. The fluorescence particle 17 may have any size according to its application as long as the size falls within a normal range. For example, if the fluorescence particles 17 are used in a plasma display panel as in this preferred embodiment, the fluorescence particle 17 may have a diameter (or a major-axis length) of approximately 1-5 μm. The surface 17s of the fluorescence particle 17 is exposed and is not covered with any metal oxide film unlike the conventional one.

The fluorescent material of the fluorescence particle 17 includes at least one element 18 selected from the group consisting of Al, Mg, Ca, Ba, Sr and Y. The at least one element 18 has a maximum value of its concentration profile in the depth direction within the range from the surface 17s of the fluorescence particle 17 through a depth D of 20 nm. And the average concentration of the at least one element 18 within the range from the surface 17s of the fluorescence particle 17 through the depth of 20 nm is preferably higher than the average concentration over the entire fluorescence particle 17. More preferably, the average concentration of the at least one element 18 is at least higher than, but at most three times as high as, the average concentration in the entire particle. As will be described in detail later, such a concentration profile of the element 18 is obtained by diffusing the element 18 inward from the surface 17s of the fluorescence particle 17. The concentration profile of the element 18 in the depth direction can be plotted by TEM-EDS. The average concentration of the element 18 is a value that was obtained based on a line analysis of the element by TEM-EDS as will be described later for specific examples of the present invention.

Also, as will be described in detail later, the element 18 achieves the effect of preventing the deterioration by reaching the defect sites of the crystal structure in that range from the surface of the fluorescence particle 17 through the depth of 20 nm. For that reason, there is an upper limit to the concentration of the element 18 that will achieve such an effect. And once the element 18 has reached every defect of a defective crystal structure, the element 18 will no longer achieve the effect of preventing the deterioration. The present inventors discovered and confirmed via experiments that the element 18 could maintain the effect of reducing the deterioration of the fluorescence particle more significantly as long as the concentration of the element 18 was at most approximately three times as high as the average concentration. That is why it is preferred that the concentration of the element 18 be at most three times as high as the average concentration.

Every constituent element of the fluorescent material but the element 18 preferably has a substantially uniform distribution. In other words, the fluorescence particle 17 is preferably made of a fluorescent material with a substantially uniform composition except that the element 18 has diffused from the surface 17s. As used herein, the constituent elements have a "substantially" uniform distribution if the dissociation of some of the constituent elements of the fluorescent material and/or the non-uniform distribution of those constituent elements to be caused inevitably during the process of making the fluorescence particles 17 are not taken into consideration. Such dissociation or non-uniform distribution is brought about due to a slight oxidation of the outermost surface of the fluorescence particles 17 being stored in the air or an exposure of the fluorescence particles 17 to an electrical discharge environment that has been created in the plasma display panel.

As will be described later, however, a portion of the fluorescence particle 17 that would actually contribute to producing fluorescenceescence is thought to be the fluorescent material in the range from the surface through a depth of approximately 10-100 nm. That is why the fluorescent material just needs to be present in the range of the fluorescence particle 17 from its surface through the depth of approximately 10-100 nm and every other constituent element of the fluorescent material just needs to have a substantially uniform distribution. In that case, the rest of the fluorescence particle 17, which is located deeper than approximately 100 nm as measured from its surface, may be a base material to carry the surface fluorescent material thereon. Optionally, the inner base material may have a different composition from the surface fluorescent material. The same can said even if the fluorescence particle 17 is not definitely split into the surface portion and the base material portion.

In such a situation, the element 18 to diffuse inward from the surface 17s of the fluorescence particle could also be contained in the base material at a different concentration than in the surface fluorescent material. In that case, the concentration profile of the element 18 in the depth direction may have a local maximum value in the range from the surface 17s of the fluorescence particle 17 through a depth D of 20 nm and may have a maximum value in the base material region (i.e., in the inner region that is located deeper than approximately 100 nm as measured from the surface). The concentration of the element 18 reaches its maximum value in that inner region deeper than approximately 100 nm as measured from the surface due to the composition of the base material, which has nothing to do with the diffusion of the element 18 from the surface. Stated otherwise, if the concentration profile of the element 18 has a local maximum in that range from the surface 17s through the depth of 20 nm, then the element 18 would have diffused from the surface. That is why even a fluorescence particle 17 with such a structure will also achieve the effect of the present invention.

As the fluorescent material of the fluorescence particle 17, any of various known fluorescent materials may be used according to the application. For example, as a blue fluorescent material for use in plasma display panels, at least one compound selected from the group consisting of (Ba, Sr)MgAl$_{10}$O$_{17}$: Eu, SrMg(SiO$_2$): Eu, Sr$_2$MgSi$_2$O$_7$: Eu, CaMgSi$_2$O$_6$: Eu and SrMgSi$_2$O$_6$: Eu could be used. In this case, the compositional formula (Ba, Sr)MgAl$_{10}$O$_{17}$: Eu means that in an oxide with the composition (Ba, Sr)MgAl$_{10}$O$_{17}$, Ba and Sr may be replaced with each other at an arbitrary ratio and some sites of Ba or Sr have been replaced with Eu.

As a green fluorescent material for use in plasma display panels, at least one compound selected from the group consisting of (Y, Gd)BO$_3$: Tb, LaPO$_4$: Ce, Tb, BaMg$_2$Al$_{14}$O$_{24}$: Eu, Mn, BaAl$_{12}$O$_{19}$: Mn, and Zn$_2$SiO$_4$: Mn could be used.

And as a red fluorescent material for use in plasma display panels, at least one compound selected from the group consisting of Y(P, V)O$_4$: Eu, Y$_2$O$_3$: Eu, (Y, Gd)$_2$O$_3$: Eu, and (Y, Gd)BO$_3$: Eu could be used.

As long as selected from the group consisting of Al, Mg, Ca, Ba, Sr and Y, the element 18 may or may not be a constituent element of the fluorescent material of the fluorescence particle 17.

If the element 18 is a constituent element of the fluorescent material of the fluorescence particle 17, then not only the element 18 coming from the fluorescent material will be distributed substantially uniformly over the entire fluorescence particle 17 but also the element 18 that has been diffused from the surface 17s of the fluorescence particle 17 will also be distributed in the range from the surface 17s through the depth D of 20 nm. As a result, the average concentration of the element 18 will be higher in that range from the surface 17s through the depth D of 20 nm than in the entire fluorescence particle 17.

On the other hand, unless the element 18 is a constituent element of the fluorescent material, the element 18 will be distributed only in the range from the surface 17s through the depth D of 20 nm. As a result, the average concentration of the element 18 will also be higher in that range from the surface 17s through the depth D of 20 nm than in the entire fluorescence particle 17.

A fluorescence particle is generally said to be a single crystalline particle. Actually, however, due to diffusion or physical impact caused during the granulation process (i.e., while constituent powders are compounded, mixed and baked), the outermost surface of the particle often has its crystal structure disturbed easily to produce ion defects or lattice defects, for example.

Meanwhile, as described above, what contributes to producing fluorescenceescence in a fluorescence particle is thought to be the fluorescent material that is located at depths of approximately 10-100 nm as measured from the surface of the particle. That is why the region contributing to producing the fluorescenceescence includes the portion with the disturbed crystal structure. And when ion particles externally collide against such a portion with the disturbed crystal structure, the degree of crystallinity of the disturbed crystal structure may further decrease or may even be destroyed. As a result, the fluorescence particle will produce no fluorescenceescence anymore.

In the fluorescence particle of the present invention, the element 18 has diffused inward within the range from the surface 17s of the fluorescence particle 17 through the depth of 20 nm without disturbing the crystal lattice of the fluorescence at all. The diffused element 18 enters the sites with ion defects or lattice defects that has had its crystal structure disturbed and bonds with oxygen, thereby repairing the disturbed crystal structure at the surface of the fluorescence particle and further strengthening the ion bonds. In this manner, the region 17a of the fluorescence particle 17 from its surface 17s through the depth of 20 nm functions as a reformed layer with an increased degree of crystallinity.

Consequently, as the ion bonds are tightened in the region 17a near the surface of the fluorescence particle 17, the fluorescence particle 17 can withstand the ion bombardment during the electrical discharge, will not have its crystal structure disturbed easily, and can maintain the property as single crystalline particle for a long time. As a result, the decrease in luminance could be minimized.

As will be described later by way of specific examples of the present invention, when analyzing the electron density distribution of the fluorescence particle by the maximum entropy method (MEM), the present inventors confirmed that the fluorescence particle 17 had high electron density and tight ion bonds. The present inventors also confirmed with a high resolution TEM that good crystallinity was maintained in the region 17a of the fluorescence particle 17.

It is also known that oxides of Al, Mg, Ca, Ba, Sr and Y (especially single crystalline oxides thereof) are materials with good electron emissivity (which are called "high γ materials"). Consequently, a lot of electrons can be supplied from the surface 17s of the fluorescence particle 17 during the electrical discharge. As a result, the electrical discharge voltage decreases, so does the impact of the ion bombardment during the electrical discharge, and therefore, the deterioration to be caused by the collision of the ion particles can be reduced.

Also, as electrons are emitted more easily from the surface 17s of the fluorescence particle 17, those electrons emitted from the fluorescence particle 17 will cover the entire surface of the fluorescence layer. As a result, even if the interval between the barrier ribs is narrowed, the electrons produced by the electrical discharge will not drift toward the barrier ribs and disappear there unlike the conventional fluorescence but the number of electron will rather increase. Consequently, as the number of electrons increases, the electrical discharge voltage decreases and Xe with an even higher density can be excited more efficiently. Therefore, ultraviolet rays with wavelengths of 147 nm and 172 nm will be produced more frequently, thus leading to a significant increase in luminance.

As described above, the fluorescence particle of this preferred embodiment includes a reformed layer in which at least one element selected from the group consisting of Al, Mg, Ca, Ba, Sr and Y has diffused in the range from its surface through a depth D of 20 nm. Since there are a reduced number of ion defects or lattice defects in that reformed layer, the fluorescence particle can withstand the ion bombardment sufficiently and its crystal structure is less likely to be disturbed. As a result, the decrease in luminance can be minimized. On top of that, at least one element selected from the group consisting of Al, Mg, Ca, Ba, Sr and Y forms ion bond with oxygen in the reformed layer, and easily emits electrons. As a result, the loss of electrons that would drift if the electrical discharge voltage decreased or the interval between the barrier ribs narrowed can be compensated for and the luminance can be increased. Consequently, the present invention provides a full-spec high-definition plasma display panel that can minimize the decrease in the luminance of the fluorescence while the panel is being driven, will never cause any color unevenness or image persistence, and will have a significantly extended life while dissipating much less power.

Hereinafter, a method of making the fluorescence particle 17 and a method for fabricating the plasma display panel 50 will be described.

Figure 3:
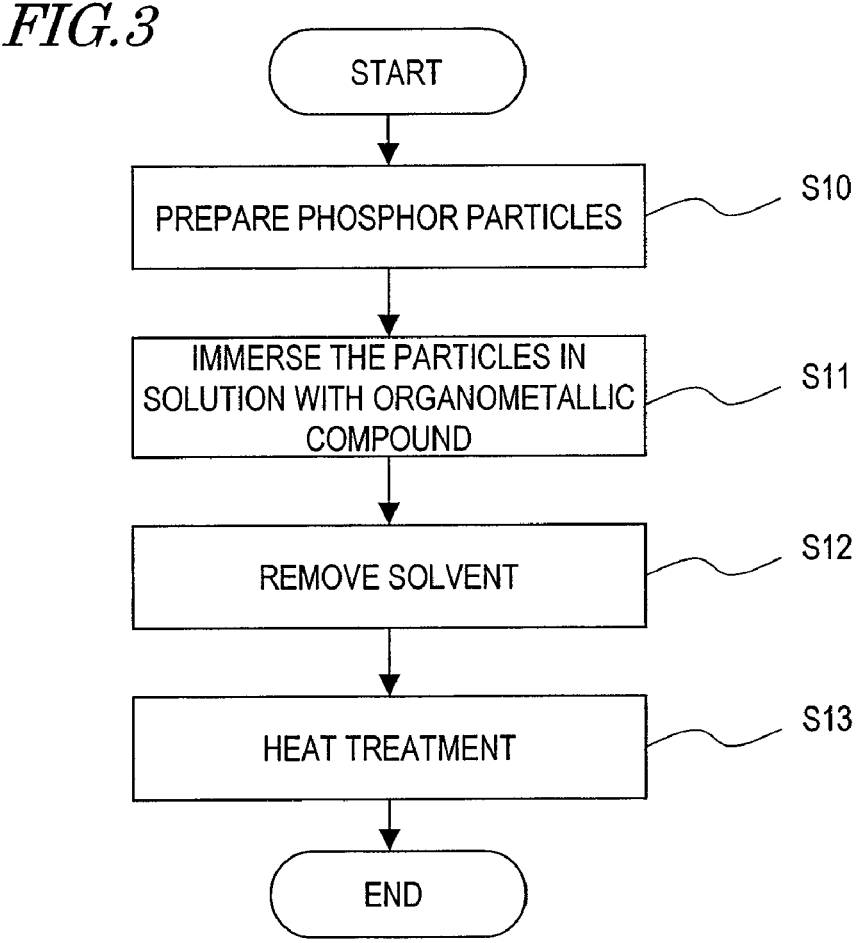
FIG. 3 is a flowchart showing how to make a fluorescence particle according to the present invention.

First of all, a method of making the fluorescence particle 17 will be described with reference to FIG. 3. As shown in FIG. 3, first, fluorescence particles of a fluorescent material are prepared (in Step S10). As the fluorescent material, a material with the known composition described above may be used. Specifically, material powders that will form the fluorescent material are compounded, mixed and baked, thereby preparing fluorescence particles with a single crystalline structure out of the fluorescent material.

Next, a solution that has a non-water-soluble organometallic compound, including at least one element selected from the group consisting of Al, Mg, Ca, Ba, Sr and Y, is prepared and the fluorescence particle is immersed in the solution (in Step S11).

Examples of preferred non-water-soluble organometallic compounds (organometallic complexes) include: metal salts of carboxylic acids, including metal salts of saturated carboxylic acids (especially metal salts of saturated aliphatic acids such as naphthenic acid, octylic acid, stearic acid, lauric acid, and caproic acid) and metal salts of unsaturated carboxylic acids (such as metal salts of methacrylic acid and acrylic acid); metal salts of acetylacetone; metallocene compounds; and β-diketones. These non-water-soluble organometallic compounds are soluble in an organic solvent (i.e., a non-aqueous solvent). Examples of preferred organic solvents include hydrocarbons such as butyl acetate, toluene, xylene, and benzene.

For example, an Mg salt of 2-ethyl hexoic acid or Al-ethylacetoacetate diisopropylate may be used as the non-water-soluble organometallic compounds and dissolved in xylene, thereby preparing a solution including organometallic compounds, which may have a concentration of 0.5 mol/L, for example.

0.05 to 5.0 parts by weight of these organometallic compounds are added in 1.0 part by weight of the fluorescence particle and 1.0 to 5.0 parts by weight of xylene solution is further added as a diluent. The solution including the organometallic compounds was preferably added within the range from 0.05 parts by weight to less than 3.0 parts by weight.

If the solution was added in less than 0.05 parts by weight, the effect of reducing the deterioration did not manifest itself. On the other hand, if the solution was added in 3.0 parts by weight or more, then the fluorescence got coated with an oxide of the organometallic compound and the initial emission intensity of the panel decreased. For these reasons, the solution was preferably added within the range of 0.05 parts by weight to 3.0 parts by weight.

After the fluorescence particles are immersed in the solution including the organometallic compounds for 5 to 10 minutes, the mixture including the fluorescence particles is filtered, and then the fluorescence particles are dried at a temperature of 120° C. to 180° C., thereby removing xylene or butyl acetate as the organic solvent (in Step S12). As a result, fluorescence particles on which the organometallic compounds have been deposited can be obtained.

Thereafter, the fluorescence particles are thermally treated in the air at a temperature of 500° C. to 650° C., more preferably at a temperature of 520° C. to 600° C. (in Step S13). The fluorescence particles are preferably kept heated to such a temperature for 10 to 120 minutes. As a result of a thermal analysis, it can be seen that the organometallic compounds start to decompose at about 480° C. If the fluorescence particles were kept heated to such a temperature for less than 10 minutes, then Al, Mg, Ca, Ba, Sr or Y included in the organometallic compounds would not diffuse sufficiently into the fluorescence particles. However, if the fluorescence particles were kept heated to such a temperature for longer than 120 minutes, then the fluorescence particles would get oxidized, thus causing a variation in luminance or chromaticity easily. The fluorescence particles are more preferably kept heated to such a temperature for 30 to 60 minutes. In this manner, the fluorescence particles of this preferred embodiment can be obtained. The fluorescence particles do not have to be thermally treated in the air but could also be treated in any other atmosphere with the partial pressure of oxygen controlled.

As described above, according to the method of making fluorescence particles of the present invention, at least one element selected from the group consisting of Al, Mg, Ca, Ba, Sr and Y is used as a non-water-soluble organometallic compound, and dissolved in an organic solvent so as to be deposited on, or adsorbed into, the surface of the fluorescence particles. In this manner, the fluorescence particles, which are an inorganic oxide, are immersed at room temperature in a solution, which is a mixture of organometallic compounds (or organometallic complexes) with no water molecules or hydroxyl groups (—OH groups) and an organic solvent with no water molecules or hydroxyl groups (—OH group), and then mixed together or stirred up. As a result, Al, Mg, Ca, Ba, Sr or Y can be adsorbed into the surface of the fluorescence particles while it is still an organometallic compound that has not been oxidized yet.

At this point in time, as there is no water or hydroxyl group (—OH group) in the mixture, the organometallic compounds (i.e., organometallic complexes) would not produce any hydrolysis in the mixture but could be adsorbed as they are (i.e., as organometallic compounds) into the surface of the fluorescence particles.

By removing the organic solvent from the mixture and drying the fluorescence particles in the air, a fluorescence powder, in which the organometallic compounds have been deposited on the surface of the fluorescence particles, can be obtained. The organic solvent could be filtered out but is preferably removed by centrifugal separation, for example, because the organometallic compounds can be deposited to a more uniform thickness over the surface of the fluorescence particles in the latter case.

Thereafter, the fluorescence powder, on which the organometallic compounds have been deposited, is heated in the air, thereby producing a thermolysis of the organometallic compounds on the surface of the fluorescence particles. The organometallic compounds then cause a chemical reaction with the fluorescence particles while diffusing into the fluorescence particles. In this process step, the fluorescence particles on which the organometallic compounds have been deposited are thermally treated within the range defined above. However, since the thermolysis reaction of the organometallic compounds involves generation of some heat, the interface between the fluorescence particles and the organometallic compounds would locally exceed the heat treatment temperature. For that reason, the metallic elements that form the organometallic compounds would diffuse through the crystal lattice of the fluorescence and could bond with oxygen in the fluorescence without disturbing the crystal lattice of the fluorescence in the range from the surface of the fluorescence particle through the depth of 20 nm and with the fluorescence kept single crystalline, thus producing such a region in which the diffused element has a high concentration.

According to a conventional method for coating the surface of a fluorescence with an organometallic compound by either dispersing or dissolving the organometallic compound in pure water or aqueous solution of alcohol (see Patent Documents Nos. 1 to 5), the organometallic compound being dispersed or dissolved in pure water or aqueous solution of alcohol will produce a hydrolysis, thereby depositing a metal hydroxide on the surface of the fluorescence. Once such a hydroxide has been deposited, a dehydration reaction will occur during the next heat treatment process. And an endothermic reaction will occur in the interface between the fluorescence and the hydroxide deposited, thus decreasing the temperature effectively. As a result, the hydroxide deposited will not diffuse through the crystal lattice of the fluorescence particle easily. Consequently, according to the conventional method, only a metal oxide film is formed so as to cover the surface of the fluorescence particle and the metal would not diffuse into the fluorescence particle easily.

For these reasons, to diffuse at least one of Al, Mg, Ca, Ba, Sr and Y through the fluorescence particle by the method described above, it is preferred that none of these metals be present as an oxide on the surface of the fluorescence. Nevertheless, even if the oxides of these metals segregated to a certain degree at triplet points of the fluorescence particles during the manufacturing process, that would not be a serious problem unless the fluorescenceescence produced by the fluorescence particles decreases significantly.

Hereinafter, a method for fabricating the plasma display panel 50 will be described with reference to FIGS. 1(*a*) and 1(*b*).

1. How to Make the Rear Panel 3

First of all, address electrodes 12 are formed in stripes on the surface of a supporting substrate 11 of glass so as to have a thickness of several μm. The material of the electrodes 12 may be a metal such as Ag, Al, Cr (chromium), Cu (copper) or Pd (palladium), or an alloy thereof. Optionally, the electrodes 12 may also have a multilayer structure by stacking films of any of these metals one upon the other.

Thereafter, a dielectric layer 13 is deposited over the address electrodes 12 on the supporting substrate 11. The dielectric layer 11 may be made of lead-based or non-lead-based low-melting glass or $SiO_2$.

Next, barrier ribs 14 are formed on the dielectric layer 13. Specifically, the entire upper surface of the dielectric layer 13 is coated with paste of low-melting glass material, baked, and then a waffle rib structure consisting of barrier ribs 14n that run parallel to the address electrodes 12 and barrier ribs 14m that cross the address electrodes 12 at right angles as shown in FIG. 1(b) is formed by a sandblasting process or a photolithographic process, for example. Adjacent electrical discharge cells are partitioned from each other by these barrier ribs 14, which may be arranged at an interval of 200 μm, for example.

Subsequently, a fluorescence layer 15 is formed over at least the address electrodes 12 inside the respective electrical discharge cells 16 that are partitioned by the barrier ribs 14. The fluorescence layer 15 may be formed by applying paste, including fluorescence particles in respective colors and a vehicle, by a printing process and then baking it. In this preferred embodiment, the fluorescence particles 17 made by the process described above are used to make the paste. As the fluorescent materials in the three primary colors of red, green and blue, $(Y, Gd)BO_3$: Eu, $(Y, Gd)BO_3$: Tb, and $BaMgAl_{10}O_{17}$: Eu may be used, respectively. Optionally, fluorescent materials with compositions for AC plasma display panels could also be used.

Alternatively, fluorescence particles, on which an organometallic compound including Al, Mg, Ca, Ba, Sr or Y has been deposited and which have not yet been subjected to a heat treatment, may be mixed with a vehicle to make a paste by the method described above, and then a heat treatment may be conducted to bake the paste to make the fluorescence layer 15, decompose the organometallic compound, and to diffuse Al, Mg, Ca, Ba, Sr or Y into the fluorescence particles. In this manner, the rear panel 3 is completed.

2. How to Make the Front Panel 2

First of all, scan electrodes 5 and sustain electrodes 6 are formed in stripes on a transparent substrate 10 of glass as shown in FIG. 1(a). More specifically, transparent scan electrodes 5 and sustain electrodes 6, made of ITO, $SnO_2$, ZnO or any other suitable material with relatively low resistance, are formed on the transparent substrate 10 so as to have a thickness of approximately 100 nm, for example. Although not shown, to lower the electrical resistance of the scan electrodes 5 and sustain electrodes 6, fine-line bus electrodes of an Ag (silver) or Al (aluminum) based electrode material, for instance, are formed on the scan electrodes 5 and sustain electrodes 6 so as to have a thickness of several μm, for example.

Next, a dielectric layer 7 is deposited on the transparent substrate 10 so as to cover these display electrodes 4. The dielectric layer 7 is made of lead or non-lead based low-melting glass or $SiO_2$ and has a thickness of several to several tens of μm. And over the dielectric layer 7, deposited is a protective coating 8 of a metal oxide material such as MgO (magnesium oxide) to a thickness of approximately 500 nm. The metal oxide has a great secondary emission coefficient γ to further decrease the electrical discharge start voltage, can withstand the sputtering process so much as to protect the dielectric layer 7 from the ion bombardment during the electrical discharge, and has optical transparency and high electrically insulating property. In this manner, the front panel 2 is completed.

3. Fabricate the Plasma Display Panel 50 by Bonding the Panels Together

The front and rear panels 2 and 3 that have been fabricated as described above are stacked one upon the other such that the display electrodes 4 on the front panel 2 cross the address electrodes 12 on the rear panel 3 at right angles, and sealing glass is inserted between the peripheries of these panels. Then, the assembly is baked to a temperature of approximately 450° C. for 10 to 20 minutes, evacuated to a high vacuum (of $1.1 \times 10^{-4}$ Pa, for example), and then an electrical discharge gas (such as an He—Xe based gas, an Ne—Xe based gas, an Ar—Xe based gas or a Kr—Xe based gas with an Xe partial pressure of 15% or more) is introduced into it with a predetermined pressure. In this manner, a plasma display panel is completed.

EXAMPLES

The present inventors actually made fluorescence particles and plasma display panels and analyzed their properties and characteristics. Following is the results of our analysis.

Example 1

Fluorescence particles were made by the method described above using the fluorescent material and organometallic compounds shown in the following Table 1. A retailed material was used as the fluorescent material. Xylene was used as a solvent to dissolve the organometallic compound, of which the concentration was adjusted in advance to 0.5 mol/L.

Next, 1.0 part by weight of fluorescence powder was mixed in the air with 0.2 parts by weight of organometallic compounds and 2.0 parts by weight of xylene as a diluent and the mixture was stirred up for about 30 minutes in a glass container. Thereafter, the mixture was filtered to separate fluorescence particles. Subsequently, the fluorescence was kept heated to about 150° C. and dried in the air for an hour. And then the dried fluorescence particles were loaded into a ceramic sheath and thermally treated at about 600° C. for 10 minutes in the air. This process step will be referred to herein as an "organometallic process on fluorescence particles".

TABLE 1

| Sample No. | Fluorescence | Added (in part by weight) | Organometallic compound | Added (in parts by weight) | Number of metals | Number of carbons | Note |
|---|---|---|---|---|---|---|---|
| A1 | $BaMgAl_{10}O_{17}$:Eu | 1.0 | Al etylacetoacetate diisopropylate | 0.2 | 1 | 12 | |
| A2 | $BaMgAl_{10}O_{17}$:Eu | 1.0 | acetoalkoxy Al diisopropylate | 0.2 | 1 | 28 | |

TABLE 1-continued

| Sample No. | Fluorescence | Added (in part by weight) | Organo-metallic compound | Added (in parts by weight) | Number of metals | Number of carbons | Note |
|---|---|---|---|---|---|---|---|
| A3 | $BaMgAl_{10}O_{17}$:Eu | 1.0 | Al acetylacetone | 0.2 | 1 | 15 | |
| A4* | $BaMgAl_{10}O_{17}$:Eu | 1.0 | Zn acetylacetone | 0.2 | 1 | 10 | |
| A5* | $BaMgAl_{10}O_{17}$:Eu | 1.0 | Cu acetylacetone | 0.2 | 1 | 10 | |
| A6* | $BaMgAl_{10}O_{17}$:Eu | 1.0 | Ni acetylacetone | 0.2 | 1 | 10 | |
| A7* | $BaMgAl_{10}O_{17}$:Eu | 1.0 | Ti acetylacetone | 0.2 | 1 | 18 | |
| A8 | $BaMgAl_{10}O_{17}$:Eu | 1.0 | Mg naphthenate | 0.2 | 1 | 14 | |
| A9* | $BaMgAl_{10}O_{17}$:Eu | 1.0 | Zn naphthenate | 0.2 | 1 | 14 | |
| A10 | $BaMgAl_{10}O_{17}$:Eu | 1.0 | Ca naphthenate | 0.2 | 1 | 14 | |
| A11* | $BaMgAl_{10}O_{17}$:Eu | 1.0 | Mn naphthenate | 0.2 | 1 | 14 | |
| A12* | $BaMgAl_{10}O_{17}$:Eu | 1.0 | Mn octylate | 0.2 | 1 | 16 | |
| A13* | $BaMgAl_{10}O_{17}$:Eu | 1.0 | Zn octylate | 0.2 | 1 | 16 | |
| A14 | $BaMgAl_{10}O_{17}$:Eu | 1.0 | Al octylate | 0.2 | 1 | 24 | |
| A15 | $BaMgAl_{10}O_{17}$:Eu | 1.0 | Ca octylate | 0.2 | 1 | 16 | |
| A16 | $BaMgAl_{10}O_{17}$:Eu | 1.0 | Ba octylate | 0.2 | 1 | 16 | |
| A17 | $BaMgAl_{10}O_{17}$:Eu | 1.0 | Y octylate | 0.2 | 1 | 24 | |
| A18* | $BaMgAl_{10}O_{17}$:Eu | 1.0 | Ni octylate | 0.2 | 1 | 24 | |
| A19 | $BaMgAl_{10}O_{17}$:Eu | 1.0 | Mg octylate | 0.2 | 1 | 24 | |
| A20 | $BaMgAl_{10}O_{17}$:Eu | 1.0 | Mg stearate | 0.2 | 1 | 36 | |
| A21 | $BaMgAl_{10}O_{17}$:Eu | 1.0 | Ca stearate | 0.2 | 1 | 36 | |
| A22* | $BaMgAl_{10}O_{17}$:Eu | 1.0 | Zn stearate | 0.2 | 1 | 36 | |
| A23 | $BaMgAl_{10}O_{17}$:Eu | 1.0 | Al stearate | 0.2 | 1 | 54 | |
| A24 | $BaMgAl_{10}O_{17}$:Eu | 1.0 | Ba stearate | 0.2 | 1 | 36 | |
| A25 | $BaMgAl_{10}O_{17}$:Eu | 1.0 | Sr stearate | 0.2 | 1 | 36 | |
| A26* | $BaMgAl_{10}O_{17}$:Eu | 1.0 | Mn stearate | 0.2 | 1 | 36 | |
| A27 | $BaMgAl_{10}O_{17}$:Eu | 1.0 | Al laurate | 0.2 | 1 | 36 | |
| A28 | $BaMgAl_{10}O_{17}$:Eu | 1.0 | Ba laurate | 0.2 | 1 | 24 | |
| A29 | $BaMgAl_{10}O_{17}$:Eu | 1.0 | Sr laurate | 0.2 | 1 | 24 | |
| A30* | $BaMgAl_{10}O_{17}$:Eu | 1.0 | Zn laurate | 0.2 | 1 | 24 | |
| A31* | $BaMgAl_{10}O_{17}$:Eu | 1.0 | Al n-butoxide | 0.2 | 1 | 12 | Coagulated |
| A32* | $BaMgAl_{10}O_{17}$:Eu | 1.0 | Al isobutoxide | 0.2 | 1 | 9 | Coagulated |
| A33* | $BaMgAl_{10}O_{17}$:Eu | 1.0 | Al secbutoxide | 0.2 | 1 | 12 | Coagulated |
| A34* | $BaMgAl_{10}O_{17}$:Eu | 1.0 | Al ethoxide | 0.2 | 1 | 6 | Coagulated |
| A35* | $BaMgAl_{10}O_{17}$:Eu | 1.0 | Mg ethoxide | 0.2 | 1 | 4 | Coagulated |
| A36* | $BaMgAl_{10}O_{17}$:Eu | 1.0 | Mg oxalate | 0.2 | 1 | 2 | Coagulated |
| A37* | $BaMgAl_{10}O_{17}$:Eu | 1.0 | None | 0.2 | 0 | 0 | |

*comparative examples (A4 to A7, A9, A11 to A13, A18, A22, A26, and A30 to A37)

Next, to examine how the metal in the organometallic compound was present in the fluorescence particles thus obtained, the degree of oxidation of Mg in the fluorescence particle Sample A19, in which $BaMgAl_{10}O_{17}$ was treated with Mg octylate, was estimated by X-ray photoelectron spectroscopy (XPS), which is also called "electron spectroscopy for chemical analysis (ESCA)". According to the XPS analysis, the degree of oxidation of atoms can be estimated in the vicinity of the surface of a solid.

Figure 4:
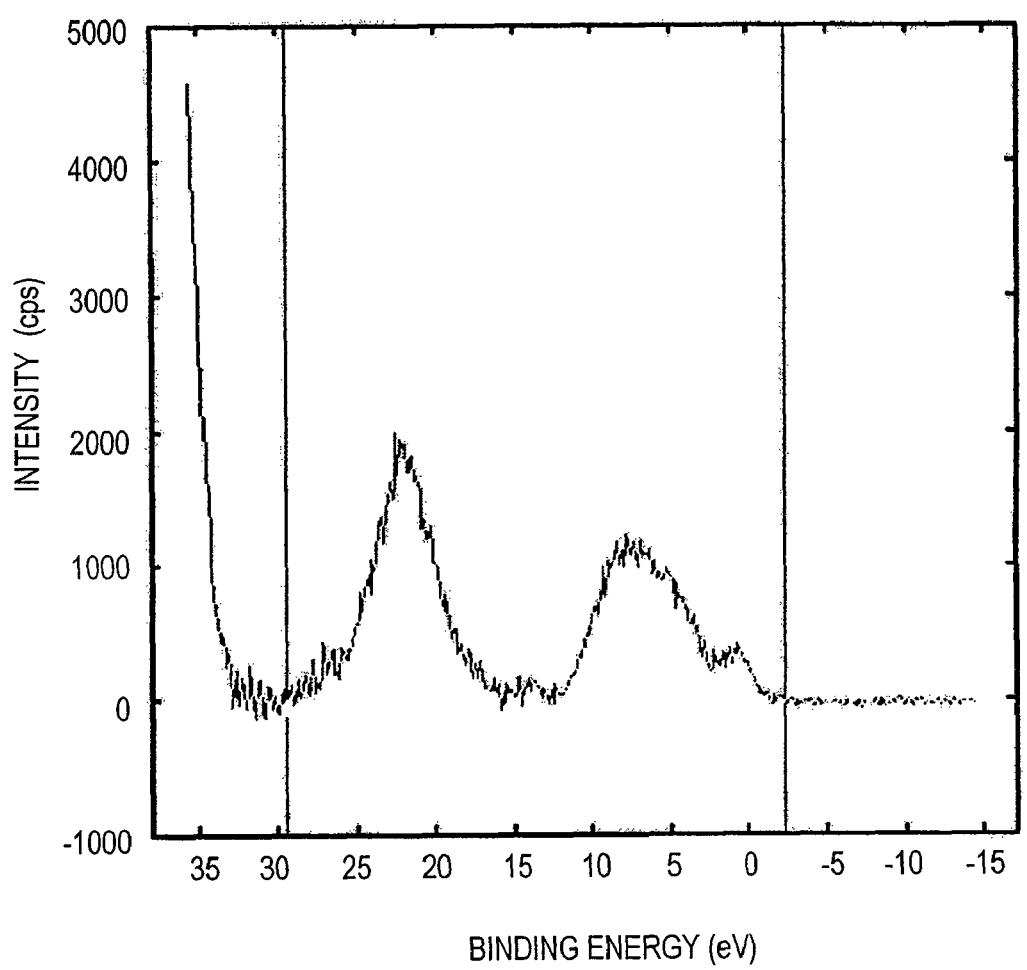
FIG. 4 is an XPS analysis spectrum of a fluorescence particle as a specific example of the present invention.
Figure 5:
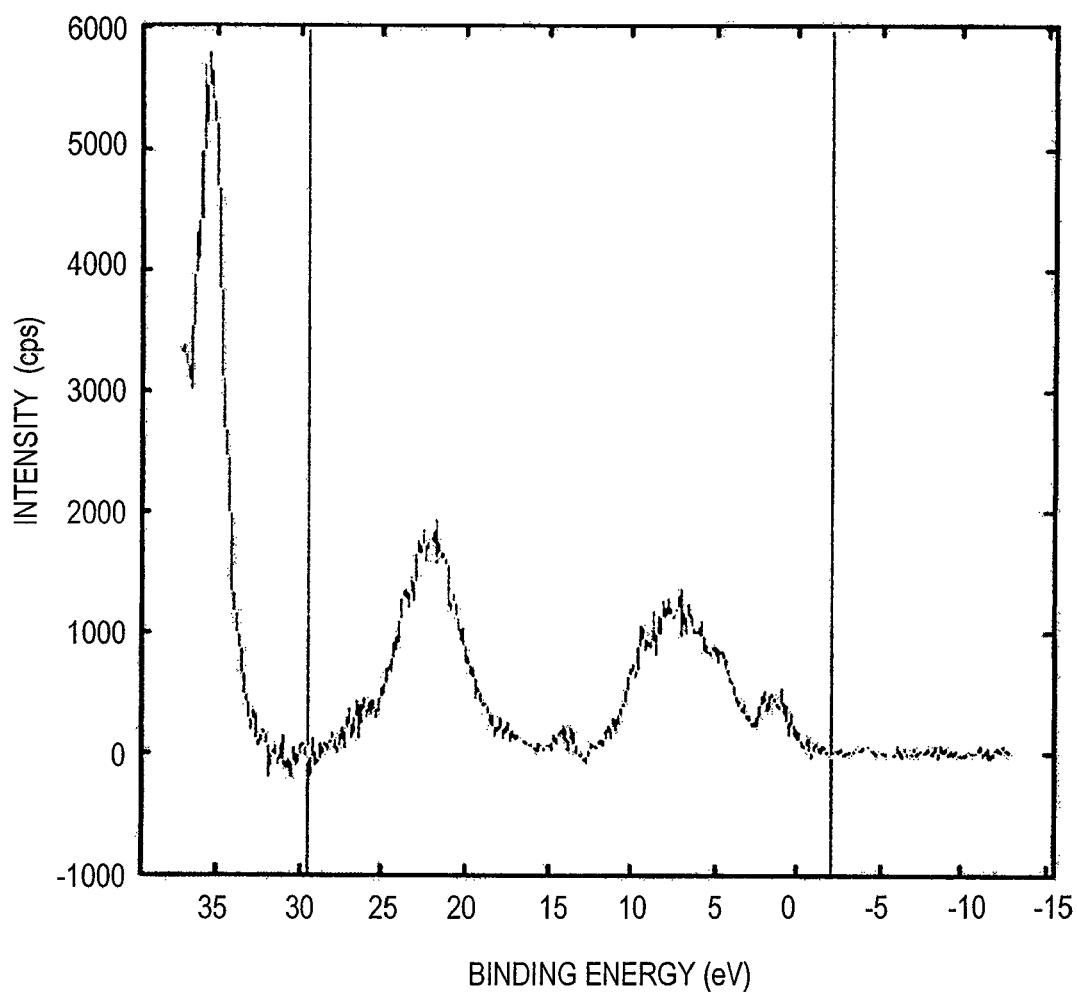
FIG. 5 is an XPS analysis spectrum of a fluorescence particle yet to be subjected to an organometallic process.

FIG. 4 shows the XPS analysis spectrum of Sample A19. FIG. 5 shows the XPS analysis spectrum of a sample obtained by thermally treating the fluorescence particles of $BaMgAl_{10}O_{17}$ yet to be subjected to the organometallic process at about 600° C. for 10 minutes. And FIG. 6 shows the XPS analysis spectrum of a sample obtained by applying a xylene solution of Mg octylate, which was used to make Sample A19, onto a glass substrate and thermally treating the sample at about 600° C. for 10 minutes.

Figure 6:
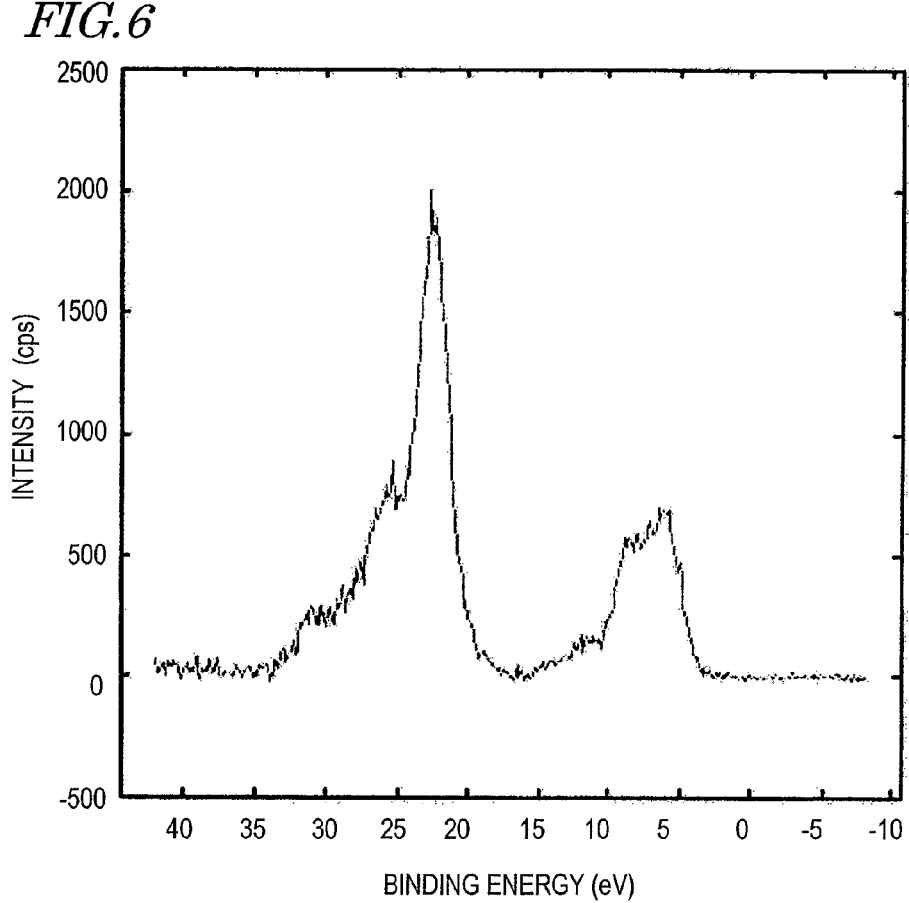
FIG. 6 is an XPS analysis spectrum of a sample obtained by applying an organometallic compound onto a glass substrate and then thermally treating it at about 600° C. for 10 minutes.
Figure 7:
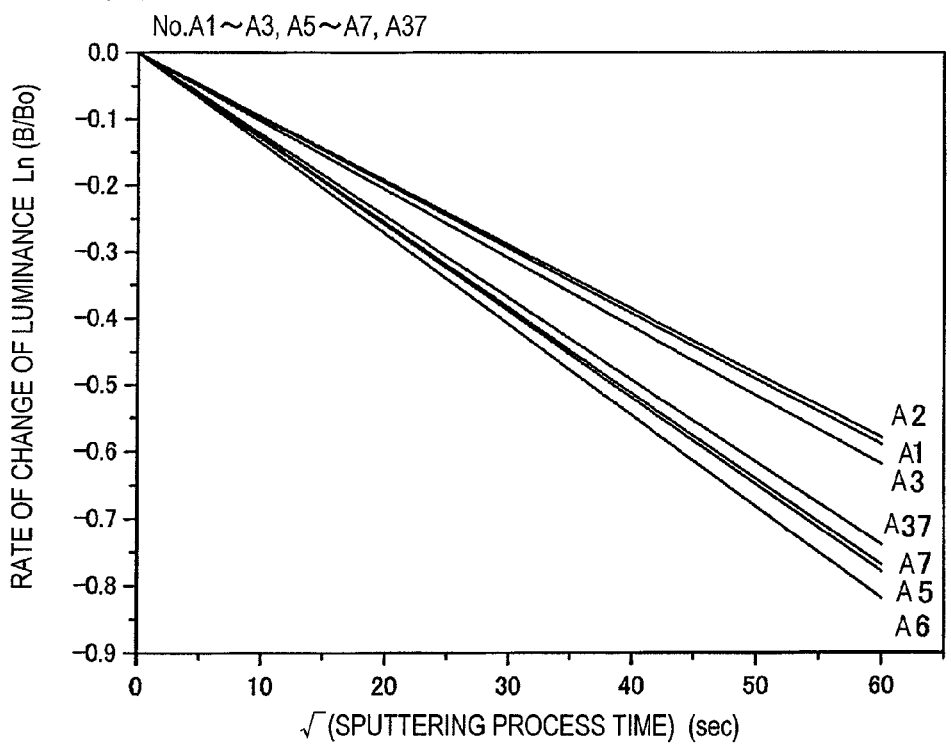
FIG. 7 shows how the rate of change of luminance varied with the ion sputtering process time when fluorescence particles representing specific examples of the present invention and comparative examples were subjected to the sputtering process.
Figure 8:
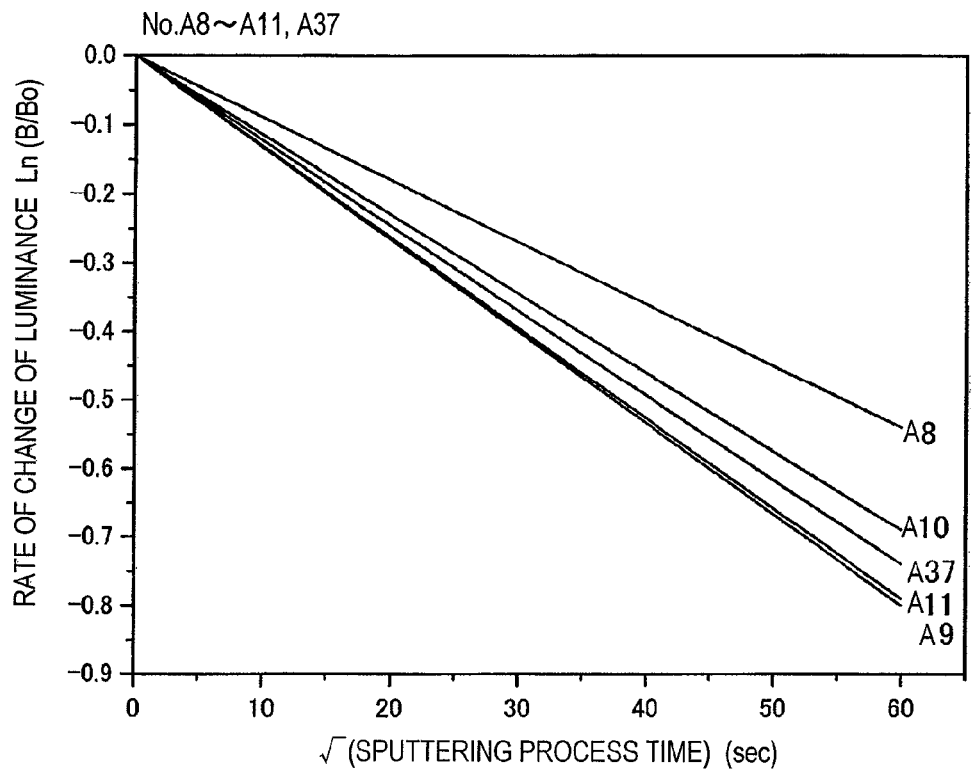
FIG. 8 shows how the rate of change of luminance varied with the ion sputtering process time when fluorescence particles representing specific examples of the present invention and comparative examples were subjected to the sputtering process.
Figure 9:
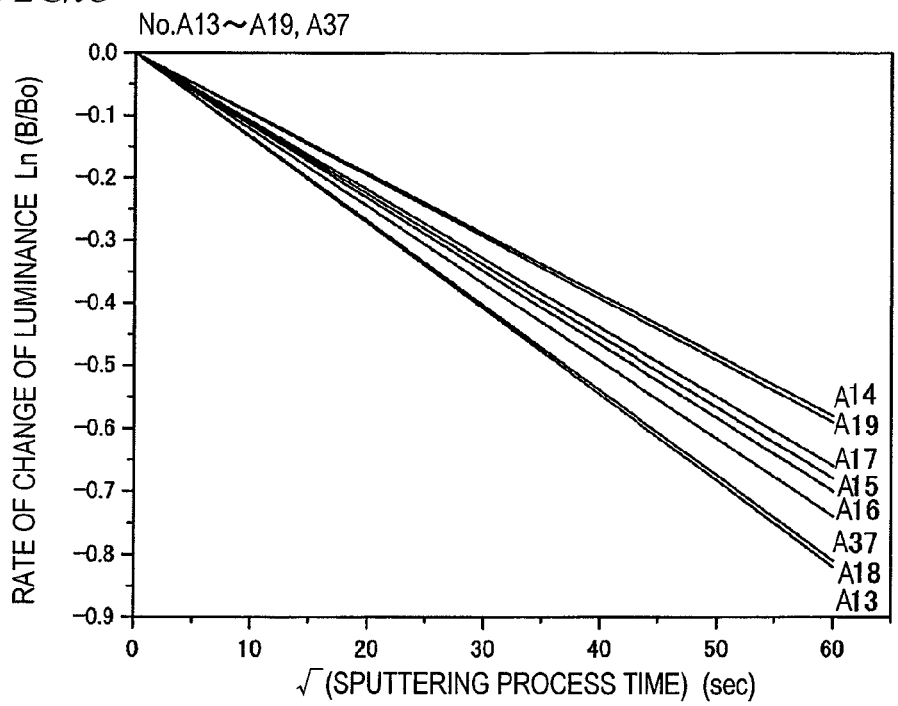
FIG. 9 shows how the rate of change of luminance varied with the ion sputtering process time when fluorescence particles representing specific examples of the present invention and comparative examples were subjected to the sputtering process.

Comparing these spectra with each other, it can be seen easily that the spectrum of Sample A19 shown in FIG. 4 agrees closely with that of the fluorescence particles that were not subjected to the organometallic process as shown in FIG. 5 but is different from that of the sample in which Mg octylate was applied onto the glass substrate as shown in FIG. 6.

In the sample in which Mg octylate was applied onto the glass substrate, magnesium oxide should have been produced on the surface of the glass substrate as a result of the heat treatment. Thus, the spectrum shown in FIG. 6 indicates the degree of oxidation of magnesium in the magnesium oxide.

On the other hand, the spectrum shown in FIG. 5 indicates the degree of oxidation of magnesium in $BaMgAl_{10}O_{17}$ that makes the fluorescence particles. That is why if there is close agreement between the spectrum of Sample A19 (see FIG. 4) and the degree of oxidation of magnesium in $BaMgAl_{10}O_{17}$, it means that magnesium in Sample A19 never has different degrees of oxidation but always has the same degree of oxidation as magnesium in $BaMgAl_{10}O_{17}$.

Thus, it can be seen that the fluorescence particle of Sample A19 does not have the structure of the conventional fluorescence particle, which is coated with a protective coating of MgO, but that magnesium that has diffused inward through the surface of the fluorescence particle as a result of the organometallic process has the same degree of oxidation as magnesium as a constituent element of the fluorescence particle. This is probably because magnesium atoms, coming from Mg octylate, would have entered the ion defect or lattice defect sites of the fluorescence particle with a disturbed crystal structure and bonded with oxygen, thereby forming an integral part of the crystal structure at the surface of the fluorescence particle, repairing the lattice defects, and further strengthening ion bonds.

Next, the fluorescence particles were subjected to the organometallic process to cause ions to collide against the fluorescence particles thus obtained, thereby evaluating a variation in properties.

To assess the damage caused by the collision of ions simply, an Ar ion sputtering apparatus was used to irradiate the fluorescence particles with Ar ions with an accelerating voltage of 100 V. And to estimate the damage caused by the collision of those ions, the emission intensities, electron density distributions by MEM and element distribution by TEM-EDS line analysis were obtained with the fluorescence particles irradiated with a vacuum ultraviolet ray (with a wavelength of 147 nm) before and after the collision of ions.

FIGS. 7 through 11 show variations in emission intensity that were measured using the samples shown in Table 1. In FIGS. 7 to 11, the abscissa represents the duration of ion bombardment (which will be referred to herein as "ion sputtering process time"), while the ordinate represents the rate of change of the luminance of the sample from its initial value.

Generally speaking, the ion sputtering process time and the change of luminance satisfy a diffusion equation, and the relation between the square of the sputtering time and the rate of change of luminance can be represented by a linear function. In each of FIGS. 7 through 11, the results were compared to those of Sample 37 that was not subjected to the organometallic process, thereby estimating how much the emission intensity decreased as a result of the ion bombardment.

Samples that were treated with an organometallic compound including, as its metallic element, Al (Sample A1, A2, A3, A14 and A23), Mg (Samples A8, A19 and A20), Ba (Samples A16, A24 and A28), Sr (Samples A25 and A29), Ca (Samples A10, A15 and A21) or Y (Sample A17) among the various organometallic compounds shown in Table 1 had gentler gradients than Sample A37, and therefore, exhibited a greater degree of sputtering resistance. Among other things, in Samples in which organometallic compounds including Al (i.e., Samples A1, A2 and A3 shown in FIG. 7, Sample A14 shown in FIG. 9, and Sample A23 shown in FIG. 10) or Mg (i.e., Sample A8 shown in FIG. 8, Sample A19 shown in FIG. 9 and Sample A20 shown in FIG. 10) were used, the decrease in emission intensity could be checked significantly.

On the other hand, samples that were treated with an organometallic compound including, as its metallic element, Ni (Samples A6 and A18), Zn (Samples A9, A13 and A22), Mn (Samples A11 and A26) or Ti (Sample A7), had steeper gradients than Sample A37 and tended to exhibit a lesser degree of sputtering resistance.

These results reveal that an organometallic compound including a metal such as Al, Mg, Ca, Ba, Sr or Y is preferably used to diffuse at least one of these metals into the fluorescence particle, and that Al or Mg is particularly preferred to diffuse into the fluorescence particle.

Although not shown, the hydrolysis of the organometallic compound advanced too rapidly in Samples A31 through A36 to evaluate them properly. Since each of these samples has just a small number of carbons, its organometallic compound would have such little stability in the air as to produce the hydrolysis easily. That is why even an organometallic compound including Al, Mg, Ca, Ba, Sr or Y would produce hydrolysis easily if the number of carbons of the organometallic compound is in the range of two to twelve.

Figure 10:
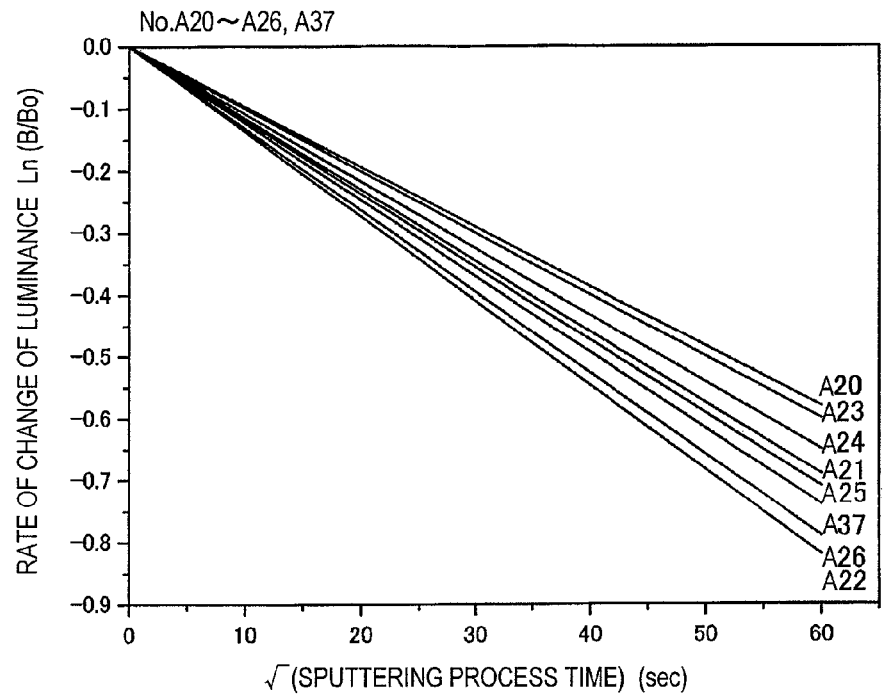
FIG. 10 shows how the rate of change of luminance varied with the ion sputtering process time when fluorescence particles representing specific examples of the present invention and comparative examples were subjected to the sputtering process.
Figure 11:
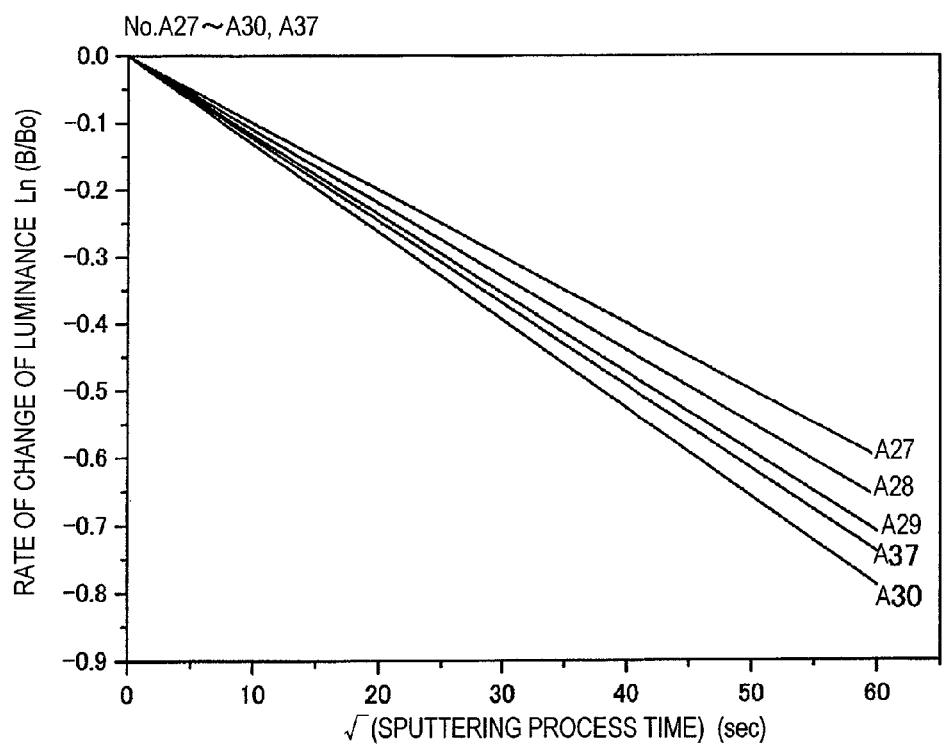
FIG. 11 shows how the rate of change of luminance varied with the ion sputtering process time when fluorescence particles representing specific examples of the present invention and comparative examples were subjected to the sputtering process.

Nevertheless, Sample A1 could be made without producing any hydrolysis. For that reason, even if the number of carbons is around 12, some organometallic compounds could have good stability according to their structure. In view of these considerations, an organometallic compound that has at least 12 carbons should rather be used. As shown in FIG. 10, even if its number of carbons is 54 (as in Sample A23), an organometallic compound with good stability could still be deposited uniformly over the surface of the fluorescence and could diffuse uniformly inside the fluorescence by going through a heat treatment. Then, the sputtering resistance could be increased. However, if the carbon chain were too long, then the carbon chain would not be broken easily during the heat treatment process and the metallic element would not diffuse easily inside the fluorescence particle. That is why the preferred number of carbons with respect to one carbon would fall within the range of approximately 12 to 30.

Next, results of electron density analysis by MEM and results of measurement by TEM-EDS will be described. The MEM analysis and the TEM-EDS were carried out to evaluate the properties of Sample A1 representing a specific example of the present invention and Sample A37 representing a comparative example.

Figure 12:
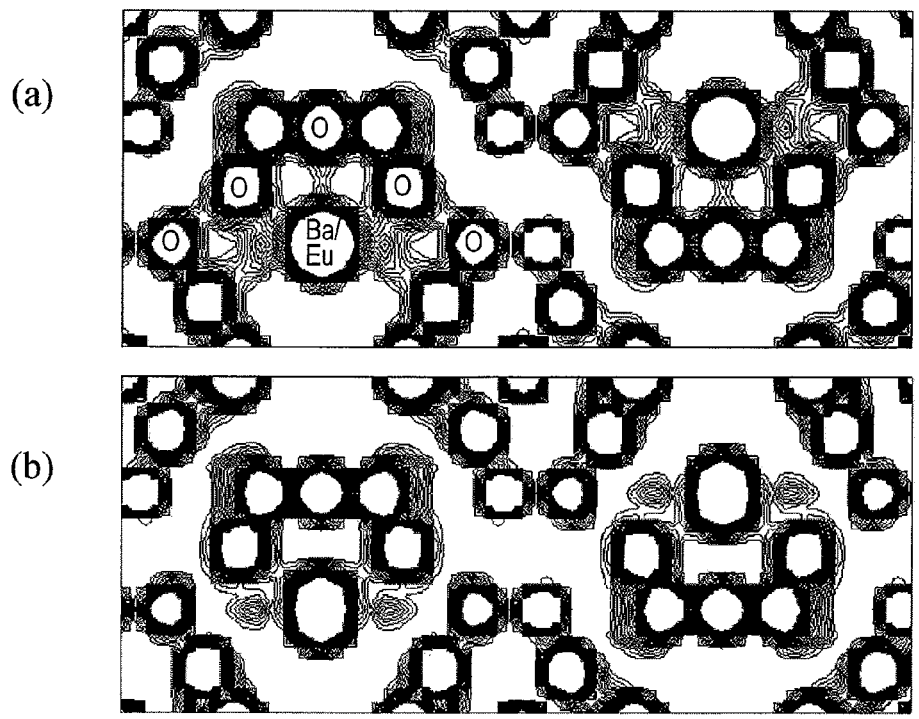
FIGS. 12(a) and 12(b) show electron density distributions obtained by carrying out an MEM analysis on a fluorescence particle representing a specific example of the present invention before and after the ion sputtering process.

FIGS. 12($a$) and 12($b$) illustrate the distributions of electron densities that were obtained by carrying out an MEM analysis before Sample A1 was subjected to an ion sputtering process and 30 seconds after Sample A1 was subjected to the ion sputtering process, respectively. In the same way, FIGS. 13($a$) and 13($b$) illustrate the distributions of electron densities that were obtained by carrying out an MEM analysis before and after Sample A19 was subjected to the ion sputtering process, respectively. Likewise, FIGS. 14($a$) and 14($b$) illustrate the distributions of electron densities that were obtained by carrying out an MEM analysis before and after Sample A37 (representing a comparative example) was subjected to the ion sputtering process, respectively. These drawings illustrate the distributions of electron densities on (110) planes of $BaMgAl_{10}O_{17}$: Eu, and the sites of Ba/Eu ions and O ions are indicated by their chemical symbols. Also, in these drawings, sites with an equal potential are connected together with a line. That is to say, equipotential lines are illustrated and there is a significant potential difference where the equipotential lines have a high density. The electron density distributions were analyzed within an electron density range of 0.0 e/Å through 1.0 e/Å and had a resolution of 0.02 e/Å.

Figure 13:
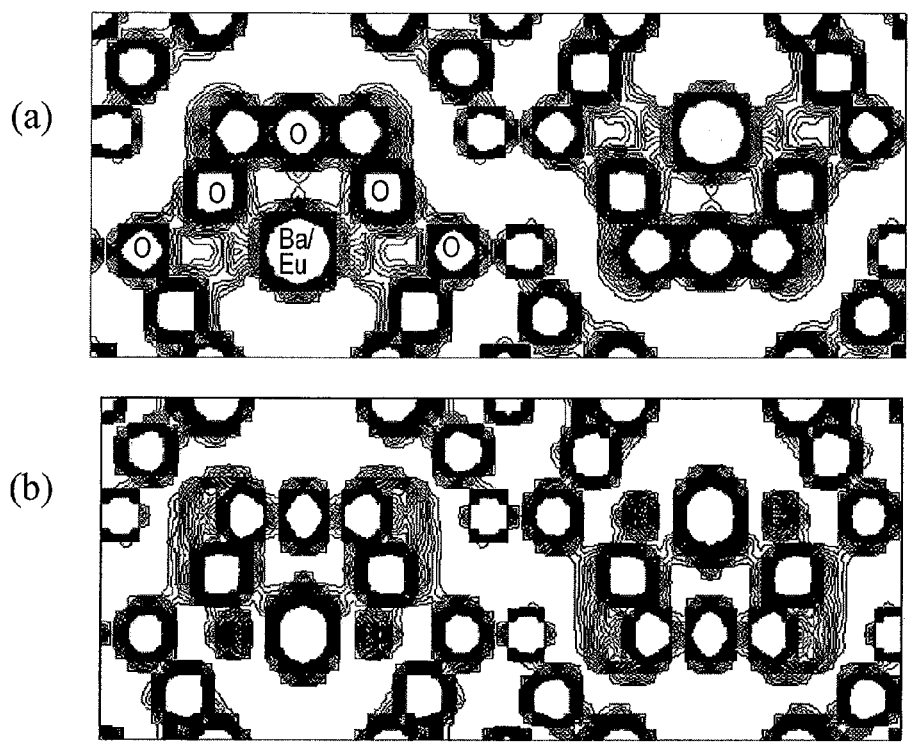
FIGS. 13(a) and 13(b) show electron density distributions obtained by carrying out an MEM analysis on a fluorescence particle representing another specific example of the present invention before and after the ion sputtering process.

As shown in FIGS. 12($a$) and 12($b$) and FIGS. 13($a$) and 13($b$), in Samples A1 and A19 representing specific examples of the present invention, the densities of the equipotential lines between the Ba/Eu ions and surrounding O ions decreased after the ion sputtering process (see FIGS. 12($b$) and 13($b$)) compared to before the ion sputtering process (see FIGS. 12($a$) and 13($a$)) but only slightly. For that reason, even after the ion sputtering process, there would have been a strong ion bond between the Ba/Cu ions and their surrounding O ions.

Figure 14:
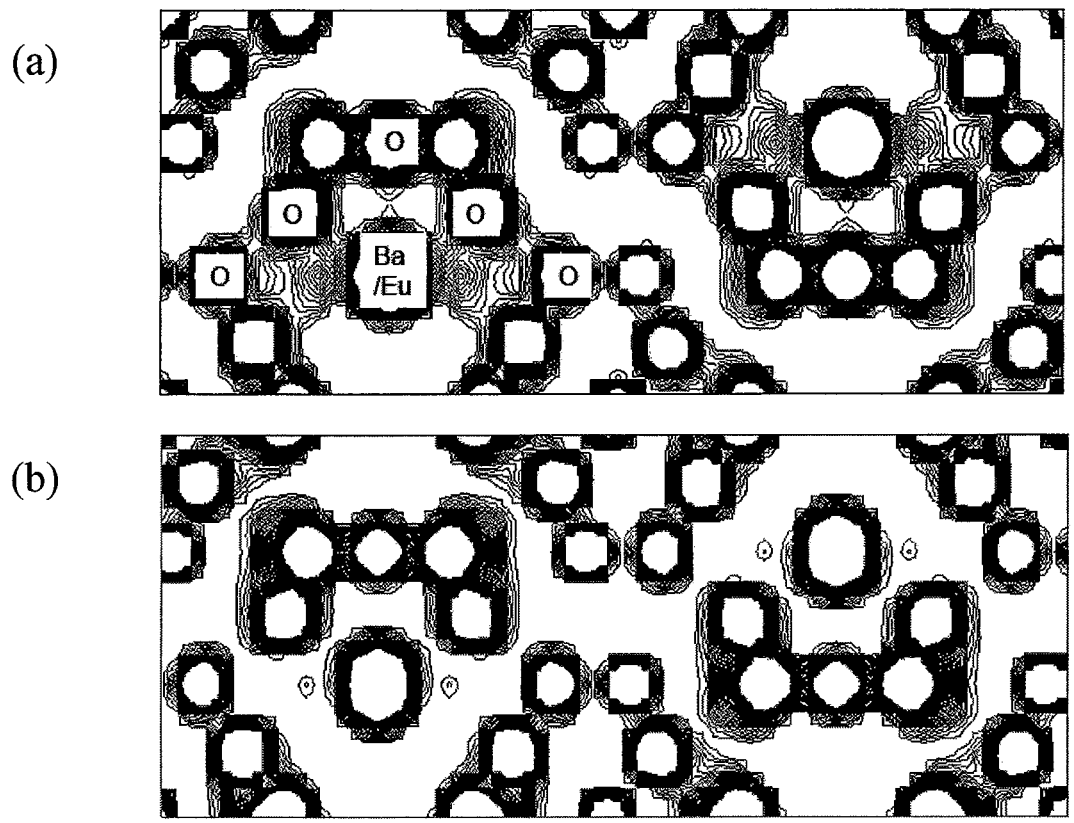
FIGS. 14(a) and 14(b) show electron density distributions obtained by carrying out an MEM analysis on a fluorescence particle representing a comparative example before and after the ion sputtering process.

On the other hand, in Sample A37 representing a comparative example, the density of the equipotential lines between the Ba/Eu ions and surrounding O ions decreased significantly after the ion sputtering process (see FIG. 14($b$)) compared to before the ion sputtering process (see FIG. 14($a$)). Also, comparing their electron density distributions before the ion sputtering process to each other, it can be seen that the density of the equipotential lines between the Ba/Eu ions and surrounding O ions in Sample A37 representing a comparative example (see FIG. 14(a)) was lower than that of the equipotential lines between the Ba/Eu ions and surrounding O ions in Samples A1 and A19 representing specific examples of the present invention (see FIGS. 12(a) and 13(a)).

Thus, in the fluorescence particle of specific examples of the present invention, cations, functioning as centers of emission, and O ions would have been bonded together so tightly before the ion sputtering process that only a small number of constituent ions would have scattered even when ions of a rare gas collided against the crystal planes during the ion sputtering process (i.e., ion bombardment) and the luminance would not have decreased so significantly.

Figure 15:
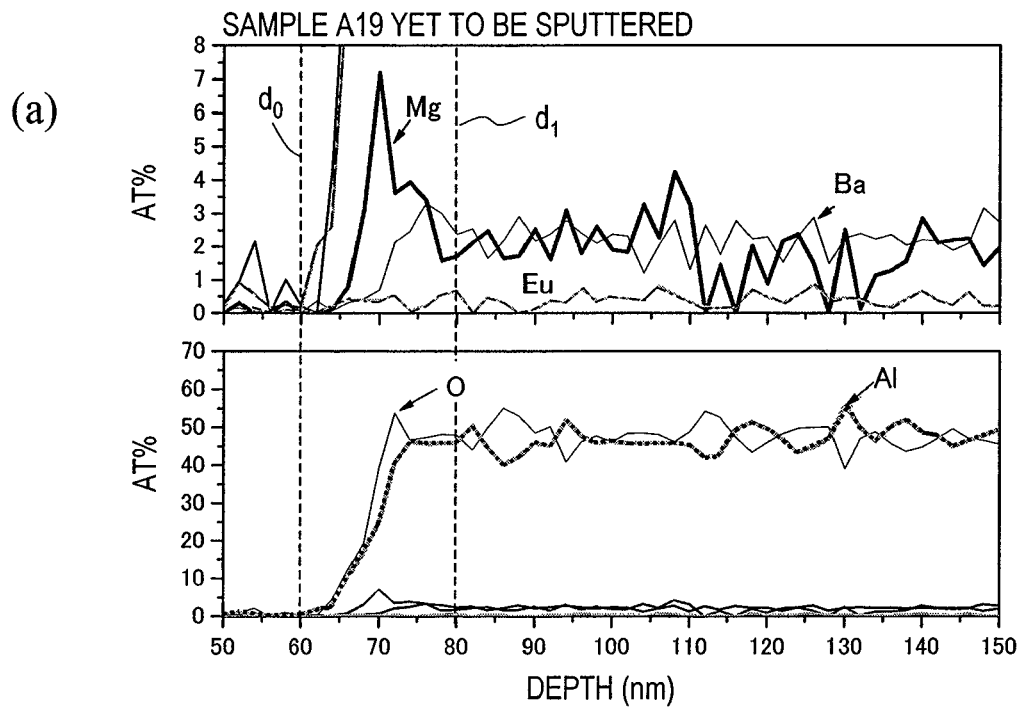
FIGS. 15(a) and 15(b) show the results of a TEM-EDS line analysis that was carried out on a fluorescence particle representing a specific example of the present invention before and after the ion sputtering process.
Figure 15:
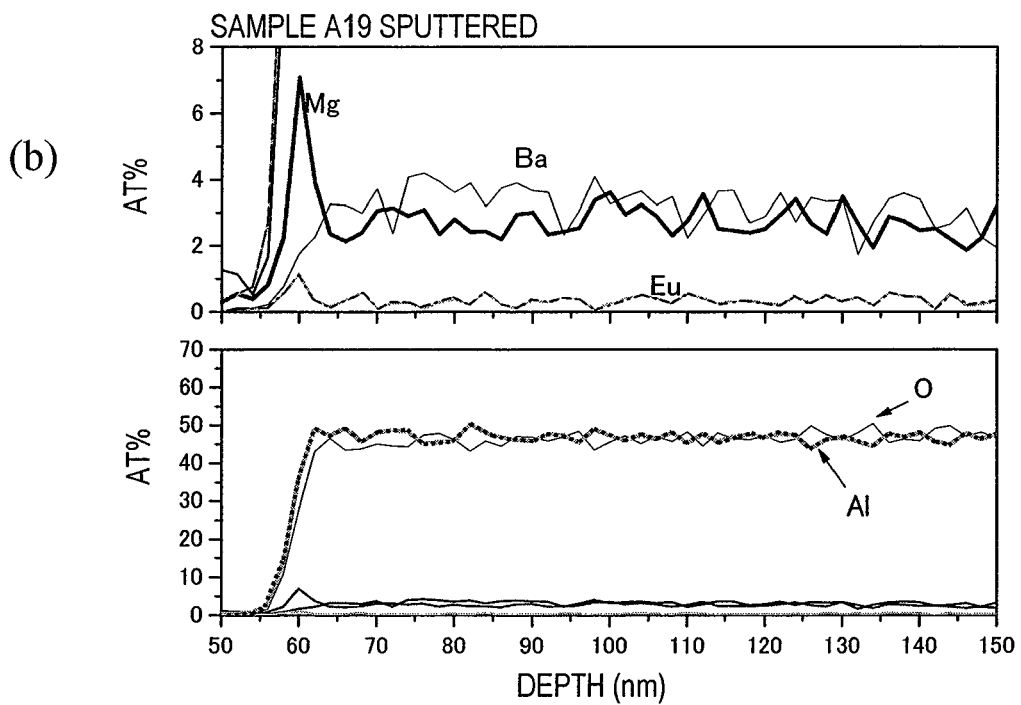
Figure 16:
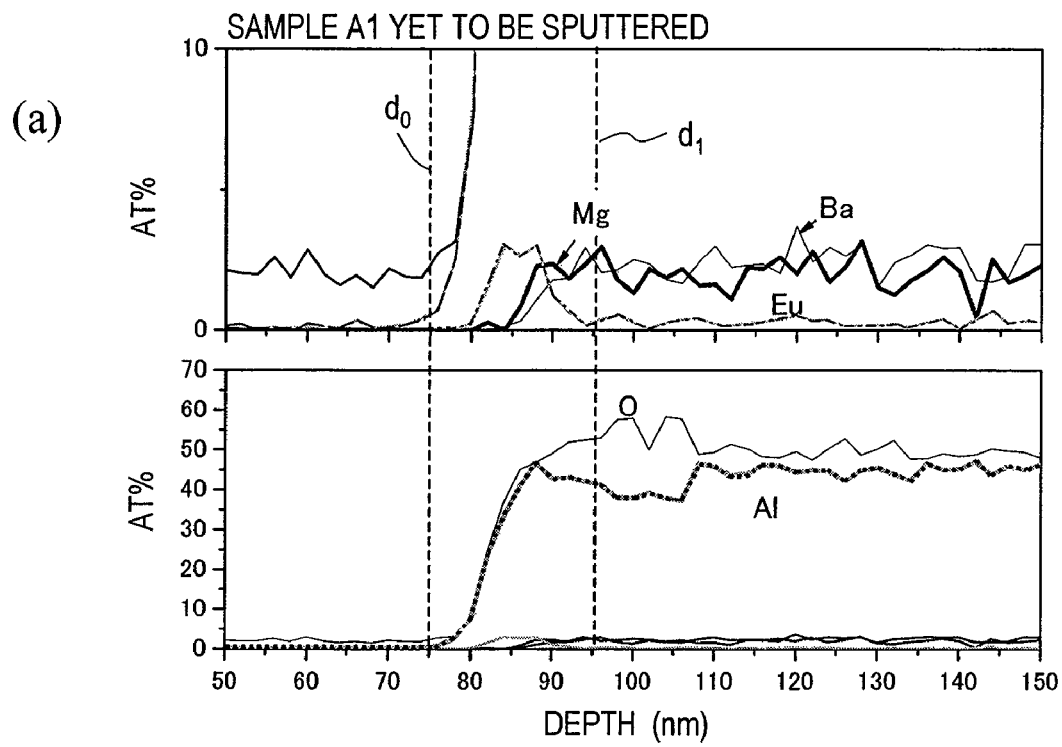
FIGS. 16(a) and 16(b) show the results of a TEM-EDS line analysis that was carried out on a fluorescence particle representing another specific example of the present invention before and after the ion sputtering process.
Figure 16:
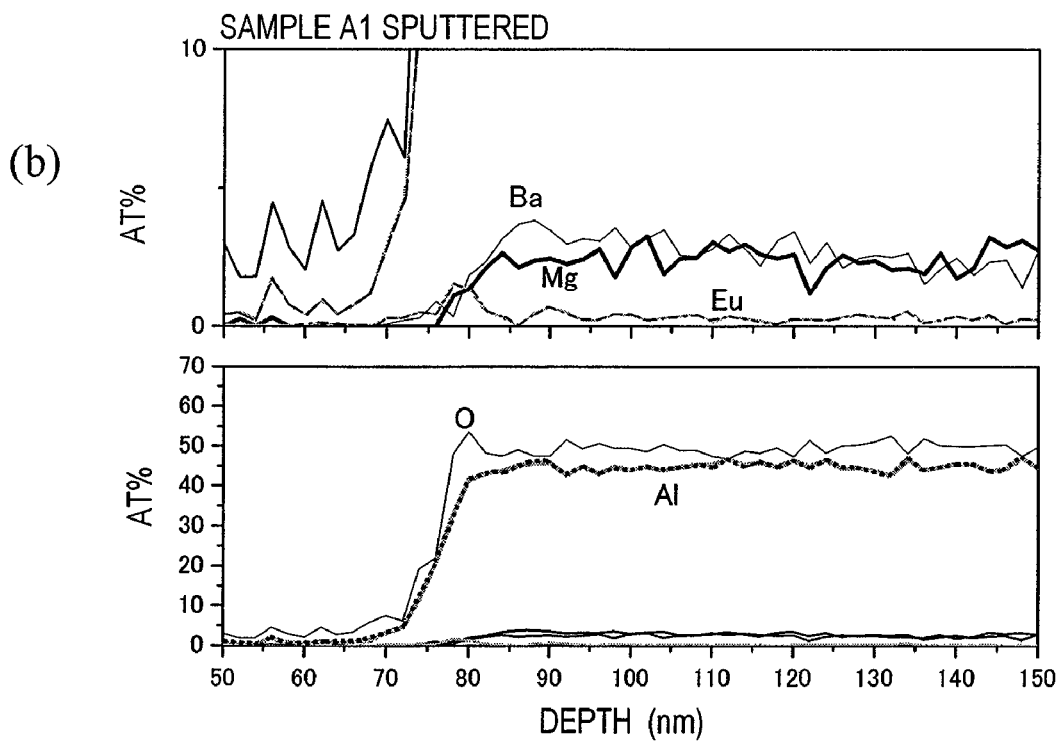
Figure 17:
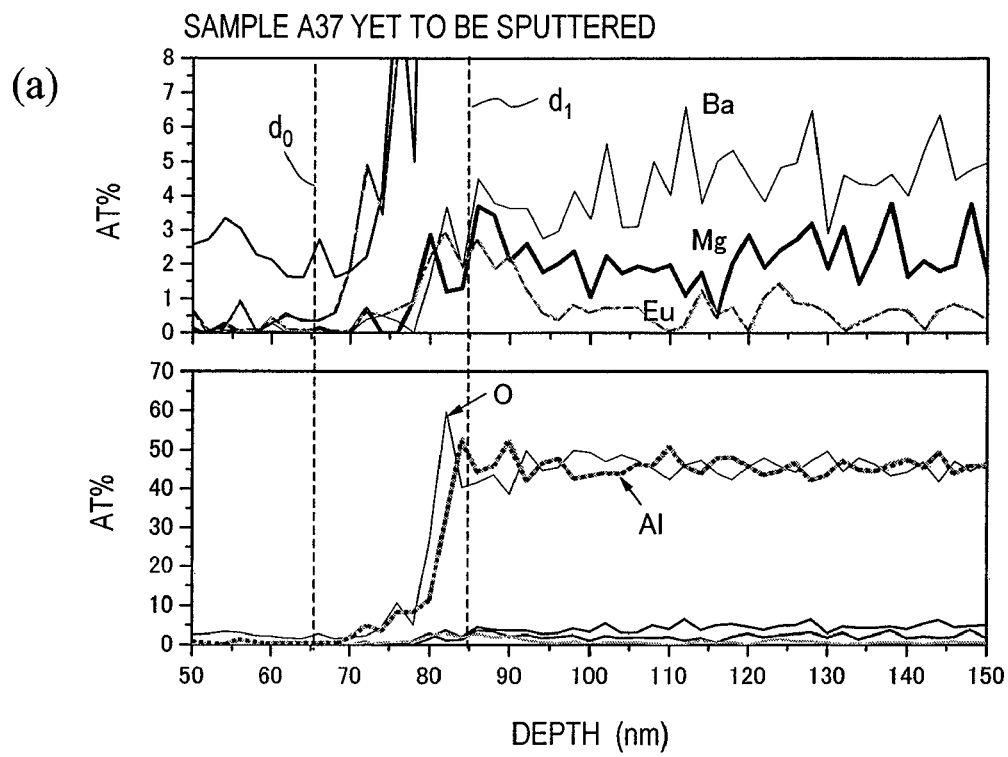
FIGS. 17(a) and 17(b) show the results of a TEM-EDS line analysis that was carried out on a fluorescence particle representing a comparative example before and after the ion sputtering process.
Figure 17:
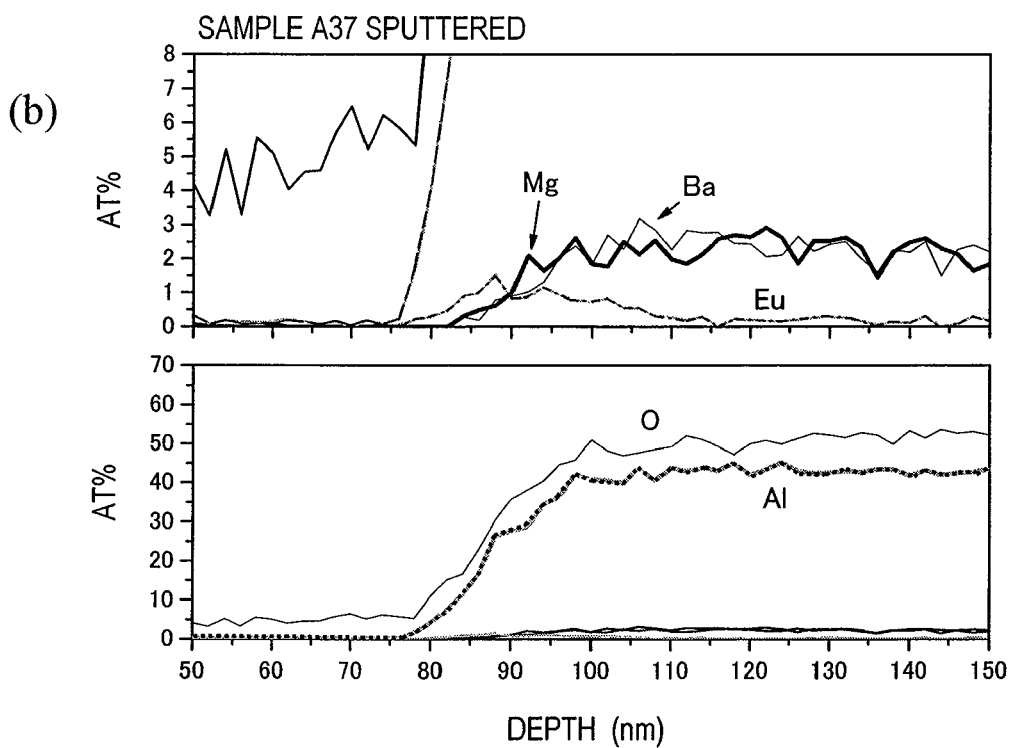

Next, results of a line analysis that was carried out on the distribution of elements by TEM-EDS will be described. FIGS. 15(a) and 15(b) show the results of a line analysis that was carried out on Sample A19, representing a specific example of the present invention, before and after the sample was subjected to an ion sputtering process, respectively. The TEM was performed with an accelerating voltage of 200 kV and the EDS was performed with a beam diameter of 1 nm. In the same way, FIGS. 16(a) and 16(b) show the results of a line analysis that was carried out on Sample A1, representing another specific example of the present invention, before and after the sample was subjected to the ion sputtering process, respectively. And FIGS. 17(a) and 17(b) show the results of a line analysis that was carried out on Sample A37, representing a comparative example, before and after the sample was subjected to the ion sputtering process, respectively.

In FIGS. 15(a), 16(a) and 17(a), the dashed line $d_0$ indicates the surface level of the fluorescence particles, while the dashed line $d_1$ indicates a level of approximately 20 nm under the surface of the particles.

As can be seen from FIGS. 15(a) and 15(b), Sample A19 had a maximum value of Mg concentration in the depth direction within the range from the surface of the fluorescence particle through a depth of 20 nm (i.e., from $d_0$ through $d_1$). More specifically, a peak of Mg concentration was located at a depth of approximately 10 nm under the surface. This peak was observed both before and after the ion sputtering process.

As can be seen from these drawings, in the fluorescence particle of the present invention, Al, Mg, Ca, Ba, Sr or Y reached deep inside the fluorescence particle and was not just deposited on the surface of the fluorescence particle. It can also be seen that the rest of the constituent elements of the fluorescent material, other than Al, Mg, Ca, Ba, Sr or Y, had substantially uniform distributions. As already described with reference to FIGS. 4 through 6, the Mg atoms that diffused inside the particle were not present as MgO but reacted to the constituent elements of the fluorescence and got introduced into the crystal lattice.

Also, there is not a significant change between the element distribution profiles shown in FIGS. 15(a) and 15(b). That is why even after having gone through the ion sputtering process, the constituent elements of the fluorescence particle would have been hardly sputtered out of, or chipped off, the surface of the particle but maintained their crystal structure in the vicinity of the surface of the fluorescence particle.

As can be seen, since a peak indicating that Al, Mg, Ca, Ba, Sr or Y was present at a high concentration was observed within the range from the surface of the fluorescence particle through a depth of 20 nm, the average concentration of Al, Mg, Ca, Ba, Sr or Y in that range from the surface of the fluorescence particle through the depth of 20 nm was higher than that of the same element over the entire fluorescence particle or that of the same element in the range deeper than 20 nm under the surface of the fluorescence particle.

On the other hand, as shown in FIGS. 16(a) and 16(b), no definite peak of Al was observed within that range from the surface of the fluorescence particle through the depth of 20 nm. This is probably because Al ions would have been present so profusely in the fluorescence particle that the distribution of diffused Al atoms could not have manifested itself as a clearly recognizable peak. Even so, the average concentration of Al from the surface of the fluorescence particle through the depth of 20 nm was still higher than that of Al over the entire fluorescence particle.

Also, just like Sample A19, there is not a significant change between the element distribution profiles shown in FIGS. 16(a) and 16(b), either. That is why even after having gone through the ion sputtering process, the constituent elements of the fluorescence particle would have been hardly sputtered out of, or chipped off, the surface of the particle but maintained their crystal structure in the vicinity of the surface of the fluorescence particle. That would have been an effect caused by the diffused Al atoms.

Meanwhile, in Sample A37, no definite peak of Mg or Al was observed within the range from the surface of the fluorescence particle through the depth of 20 nm as shown in FIGS. 17(a) and 17(b). Furthermore, the element distribution profiles shown in FIG. 17(b) deformed significantly compared to the one shown in FIG. 17(a). This is probably because the constituent elements of the fluorescence particle would have been sputtered out of, or chipped off, the surface of the particle by going through the ion sputtering process.

Figure 18:
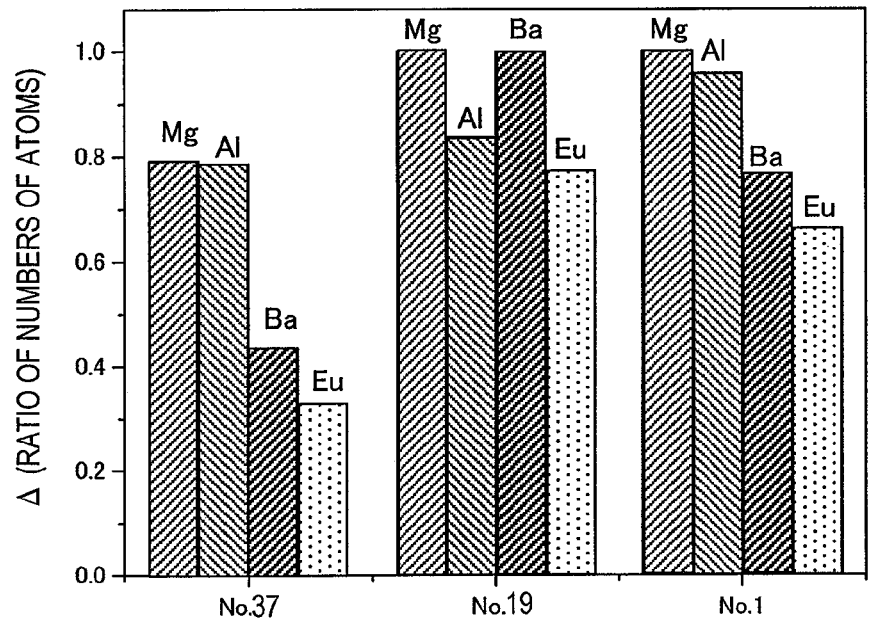
FIG. 18 shows the rates of change of the distribution percentages of respective constituent elements before and after the ion sputtering process.

FIG. 18 shows the rates of change of the distribution percentages of the respective elements in Samples A1, A19 and A37 before and after the ion sputtering process. These rates of change were calculated based on the integrated values of the TEM-EDS intensities of the respective elements at a depth of 500 nm under the surface. As can be seen easily from FIG. 18, in Sample A37 that was not subjected to the organometallic process, Ba and Eu ions decreased significantly after the ion sputtering process. This is probably because due to the collision of Ar ions against the fluorescence particle, Ba and Eu ions would have scattered to disturb the crystal structure. Since these are centers of fluorescenceescence, the fluorescenceescence intensity also declined with the decrease of Ba and Eu ions.

On the other hand, in Samples A1 and A19, Ba, Eu and other ions did not decrease significantly. That is to say, the disturbance of the crystal structure would have been reduced.

These results revealed that by depositing a non-water-soluble organometallic compound on the surface of fluorescence particle and thermally treating it to diffuse the metal inside the fluorescence particle, its resistance against ion bombardment (i.e., ion sputtering process) will increase. On top of that, the electron density will also increase in the vicinity of the center of fluorescenceescence and can be kept high. In addition, it is possible to prevent the ion bombardment from disturbing the crystal structure and scattering the Ba and Eu ions.

Summarizing these results, it can be said that in fluorescence particle subjected to the organometallic process, the crystals would have their ion bond strengthened and their resistance against ion bombardment increased. It can also be seen that if approximately 0.2 parts by weight of an organic metal is added to a diluent, then the constituent elements of the organic metal would not be deposited physically to form a coating film on the surface of a fluorescence particle but would diffuse inside the crystal lattice to be crystals that form the fluorescence particle.

Example 2

The present inventors fabricated a plasma display panel using the fluorescence particles of the present invention and evaluated its characteristics.

Fluorescence particles in the respective colors of R, G and B were made by the method described above using the fluorescent materials and organometallic compounds shown in the following Table 2. Retailed materials were used as the fluorescent materials. Xylene was used as a solvent to dissolve the organometallic compound, of which the concentration was adjusted in advance to 0.5 mol/L.

TABLE 2

| Sample No. | Fluorescence | | | Added in part by weight | Organometallic compound | | |
|---|---|---|---|---|---|---|---|
| | R (red) | G (green) | B (blue) | | Organometallic compound and its amount | Number of metals | Number of carbons |
| B1 | (Y, Gd)BO$_3$:Eu | (Y, Gd)BO$_3$:Tb | BaMgAl$_{10}$O$_{17}$:Eu | 1 | Al ethylacetate diisopropylate (0.2) | 1 | 12 |
| B2 | (Y, Gd)BO$_3$:Eu | (Y, Gd)BO$_3$:Tb and ZN$_2$SiO$_4$:Mn | BaMgAl$_{10}$O$_{17}$:Eu | 1 | Al acetoalkoxy diisopropylate (0.2) | 1 | 28 |
| B3 | (Y, Gd)BO$_3$:Eu and YVO$_4$:Eu | (Y, Gd)BO$_3$:Tb and Zn$_2$SiO$_4$:Mn | BaMgAl$_{10}$O$_{17}$:Eu | 1 | Al acetylacetone (0.2) | 1 | 15 |
| B4 | (Y, Gd)BO$_3$:Eu | (Y, Gd)BO$_3$:Tb and Zn$_2$SiO$_4$:Mn | BaMgAl$_{10}$O$_{17}$:Eu | 1 | Mg octylate (0.2) | 1 | 24 |
| B5 | (Y, Gd)BO$_3$:Eu | (Y, Gd)BO$_3$:Tb and Zn$_2$SiO$_4$:Mn | BaMgAl$_{10}$O$_{17}$:Eu | 1 | Ca octylate (0.2) | 1 | 16 |
| B6 | YVO$_4$:Eu | (Y, Gd)BO$_3$:Tb | Ba$_{0.7}$Sr$_{0.3}$MgAl$_{10}$O$_{17}$:Eu | 1 | Ba octylate (0.2) | 1 | 16 |
| B7 | (Y, Gd)BO$_3$:Eu | (Y, Gd)BO$_3$:Tb and LaPO$_4$:Ce,Tb | BaMgAl$_{10}$O$_{17}$:Eu | 1 | Y octylate (0.2) | 1 | 24 |
| B8 | (Y, Gd)BO$_3$:Eu | (Y, Gd)BO$_3$:Tb | Sr$_2$MgSi$_2$O$_7$:Eu | 1 | Mg octylate (0.2) | 1 | 24 |
| B9 | (Y, Gd)BO$_3$:Eu | (Y, Gd)BO$_3$:Tb | CaMgSi$_2$O$_6$:Eu | 1 | Mg octylate (0.2) | 1 | 24 |
| B10 | (Y, Gd)BO$_3$:Eu | (Y, Gd)BO$_3$:Tb | SrMgSi$_2$O$_6$:Eu | 1 | Mg naphthenate (0.2) | 1 | 14 |
| B11 | (Y, Gd)BO$_3$:Eu | (Y, Gd)BO$_3$:Tb | BaMgAl$_{10}$O$_{17}$:Eu | 1 | Y stearate (0.2) | 1 | 54 |
| B12 | (Y, Gd)BO$_3$:Eu and YVO$_4$:Eu | (Y, Gd)BO$_3$:Tb and BaMgAl$_{10}$O$_{17}$:Eu,Mn | BaMgAl$_{10}$O$_{17}$:Eu | 1 | Al stearate (0.2) | 1 | 54 |
| B13 | (Y, Gd)BO$_3$:Eu | (Y, Gd)BO$_3$:Tb | BaMgAl$_{10}$O$_{17}$:Eu | 1 | Ba stearate (0.2) | 1 | 36 |
| B14 | (Y, Gd)BO$_3$:Eu | (Y, Gd)BO$_3$:Tb | BaMgAl$_{10}$O$_{17}$:Eu | 1 | Sr stearate (0.2) | 1 | 36 |
| B15 | (Y, Gd)BO$_3$:Eu | (Y, Gd)BO$_3$:Tb | BaMgAl$_{10}$O$_{17}$:Eu | 1 | Al laurate (0.2) | 1 | 36 |
| B16 | (Y, Gd)BO$_3$:Eu | (Y, Gd)BO$_3$:Tb | BaMgAl$_{10}$O$_{17}$:Eu | 1 | Ba laurate (0.2) | 1 | 24 |
| B17 | (Y, Gd)BO$_3$:Eu | (Y, Gd)BO$_3$:Tb and BaMgAl$_{12}$O$_{19}$:Eu,Mn | BaMgAl$_{10}$O$_{17}$:Eu | 1 | Sr laurate (0.2) | 1 | 24 |
| B18* | (Y, Gd)BO$_3$:Eu | (Y, Gd)BO$_3$:Tb | BaMgAl$_{10}$O$_{17}$:Eu | 1 | Y ethoxide (0.2) | 1 | 6 |
| B19* | (Y, Gd)BO$_3$:Eu | (Y, Gd)BO$_3$:Tb | BaMgAl$_{10}$O$_{17}$:Eu | 1 | Ca butoxide (0.2) | 1 | 8 |
| B20* | (Y, Gd)BO$_3$:Eu | (Y, Gd)BO$_3$:Tb | BaMgAl$_{10}$O$_{17}$:Eu | 1 | Ba butoxide (0.2) | 1 | 8 |
| B21* | (Y, Gd)BO$_3$:Eu | (Y, Gd)BO$_3$:Tb | BaMgAl$_{10}$O$_{17}$:Eu | 1 | Al ethoxide (0.2) | 1 | 6 |
| B22* | (Y, Gd)BO$_3$:Eu | (Y, Gd)BO$_3$:Tb | BaMgAl$_{10}$O$_{17}$:Eu | 1 | Sr ethoxide (0.2) | 1 | 4 |
| B23* | (Y, Gd)BO$_3$:Eu | (Y, Gd)BO$_3$:Tb | BaMgAl$_{10}$O$_{17}$:Eu | 1 | Mg ethoxide (0.2) | 1 | 4 |
| B24* | (Y, Gd)BO$_3$:Eu | (Y, Gd)BO$_3$:Tb | BaMgAl$_{10}$O$_{17}$:Eu | 1 | Mg oxalate (0.2) | 1 | 2 |
| B25* | (Y, Gd)BO$_3$:Eu | (Y, Gd)BO$_3$:Tb | BaMgAl$_{10}$O$_{17}$:Eu | 1 | None | 0 | 0 |

TABLE 2-continued

| | Evaluation | | | |
|---|---|---|---|---|
| Sample No. | Discharge voltage (V) | Luminance (cd/cm$^2$) | Luminance ratio (No. 25) | Luminance variation(%) in 1,000 hours |
| B1 | 180 | 1501 | 2.24 | −1.50 |
| B2 | 183 | 1507 | 2.25 | −2.30 |
| B3 | 181 | 1503 | 2.24 | −2.10 |
| B4 | 176 | 1520 | 2.27 | −1.00 |
| B5 | 183 | 1487 | 2.21 | −1.80 |
| B6 | 177 | 1511 | 2.26 | −1.10 |
| B7 | 179 | 1505 | 2.25 | −1.60 |
| B8 | 181 | 1508 | 2.25 | −1.50 |
| B9 | 182 | 1492 | 2.23 | −1.70 |
| B10 | 180 | 1506 | 2.25 | −1.40 |
| B11 | 186 | 1432 | 2.14 | −2.20 |
| B12 | 185 | 1421 | 2.11 | −2.30 |
| B13 | 182 | 1486 | 2.22 | −1.70 |
| B14 | 181 | 1428 | 2.13 | −1.50 |
| B15 | 185 | 1330 | 2.06 | −1.90 |
| B16 | 184 | 1412 | 2.11 | −1.50 |
| B17 | 188 | 1351 | 2.02 | −2.50 |
| B18* | 211 | 687 | 1.03 | −5.90 |
| B19* | 205 | 702 | 1.05 | −6.60 |
| B20* | 201 | 704 | 1.05 | −5.20 |
| B21* | 217 | 757 | 1.13 | −5.30 |
| B22* | 209 | 682 | 1.02 | −4.90 |
| B23* | 208 | 781 | 1.17 | −5.80 |
| B24* | 215 | 678 | 1.01 | −6.50 |
| B25* | 230 | 670 | 1.00 | −9.30 |

*Comparative examples (B18 to B25)

Next, the fluorescence particles were subjected to an organometallic process. As in the first specific example described above, 1.0 part by weight of fluorescence powder was mixed in the air with 0.2 parts by weight of organometallic compounds and 2.0 parts by weight of xylene as a diluent and the mixture was stirred up for about 30 minutes in a glass container. Thereafter, the mixture was filtered to separate fluorescence particles. Subsequently, the fluorescence was kept heated to about 150° C. and dried in the air for an hour. And then the dried fluorescence particles were loaded into a ceramic sheath and thermally treated at about 600° C. for 10 minutes in the air.

A plasma display panel was fabricated by the method described above using the fluorescence particles that had been prepared in this manner. Samples B1 through B17 representing specific examples of the present invention and Samples B18 through B25 representing comparative examples had a resolution of 1,920 horizontal pixels by 1,080 vertical pixels and also had 50-inch full-spec high definition specifications. One cell pitch (one barrier rib pitch) was 0.20 mm horizontally. The samples were evaluated in the following manner.

Samples B1 through B17 that had been subjected to the organometallic process, Sample B25 that had not been subjected to the organometallic process, and alkoxides of Al, Mg, Ca, Ba, Sr and Y were subjected to a hydrolysis. And as for Samples B18 through B24 in which the surface of the fluorescence particle was coated with an oxide, the electrical discharge voltage (i.e., the voltage to increase the voltage applied to the panel and turn the entire panel ON uniformly) thereof was measured.

Next, the respective samples were driven with their best drive voltages of 180 to 220 V and at 100 kHz. The luminances of those samples when they were driven under the conditions of all white image were measured with a luminometer. And the ratios of their luminances to that of Sample 25 representing a comparative example and using a non-coated fluorescence were calculated. Meanwhile, the respective samples were driven with their best drive voltages of 180 to 220 V and at 100 kHz. The luminances of all image images were measured in 1,000 hours and the rates of change of the luminances from the initial values were calculated.

As shown in Table 2, compared to Sample B25 that was not subjected to the organometallic process and Samples B18 through B25 representing comparative examples, which were subjected to a hydrolysis process using metal alkoxides, Samples B1 through B17 that were subjected to the organometallic process had lower electrical discharge voltages, higher luminances, and lower rates of change of the luminances of all white images. Among other things, significant effects were achieved particularly when an organometallic compound including Al and Mg were used.

Also, even among these Samples B1 through B17 that were subjected to the organometallic process, the rates of change of their luminances in 1,000 hours were significantly different from each other according to the types of the organometallic compounds. This is probably because the greater the number of carbons with respect to one metal, the more stabilized the organometallic compound gets in the air and the less likely the hydrolysis will occur. That is why the metal would diffuse inside the fluorescence particle more easily without producing any oxide and the deterioration of the fluorescence would be reduced even more significantly. Nevertheless, if the carbon chain were too long, then the carbon chain could not be broken easily during heating and the metal could not diffuse through the fluorescence particle easily. For that reason, the number of carbons preferably falls within the range of 12 to 30 with respect to one metal.

As described above, by diffusing at least one element selected from the group consisting of Al, Mg, Ca, Ba, Sr and Y in the range of the fluorescence particle from its surface through a depth D of 20 nm, the defects of the crystal structure and ion defects can be repaired in the vicinity of the surface of the fluorescence particle, thus minimizing the decrease in luminance. In addition, these diffusing metals will form an ion bond with oxygen inside the fluorescence particle, thus emitting electrons easily. As a result, the luminance can be increased with the electrical discharge voltage decreased.

Next, a single fluorescence particle was tested for any variation in its property when ions collided against the particle. As in the first specific example described above, an Ar ion sputtering apparatus was used to irradiate the blue fluorescence particles of Samples B1 and B4 representing specific examples of the present invention and Sample B25 representing a comparative example with Ar ions with an accelerating voltage of 100 V. And before and after the collision of ions caused damage, the emission intensities, electron density distributions by MEM and element distribution by TEM-EDS line analysis were obtained with the fluorescence particles irradiated with a vacuum ultraviolet ray (with a wavelength of 147 nm). As a result, similar results of measurements to the ones shown in FIGS. 12 through 18 for the first specific example described above were obtained.

Summarizing these results, it was discovered that even when a plasma display panel is fabricated using the fluorescence particles of the present invention, the resistance of the fluorescence particles against ion bombardment (i.e., ion sputtering process) can be increased by depositing a non-water-soluble organometallic compound on the surface of the fluorescence particles and thermally treating it to diffuse the metal inside the fluorescence particles. On top of that, the electron density also increases in the vicinity of the center of fluorescenceescence and can be kept high, thus preventing electrons produced as a result of electrical discharge from drifting toward the barrier ribs and disappearing there. Furthermore, the number of electrons emitted can also be increased. As a result, the electrical discharge voltage decreases to excite Xe with an even higher concentration efficiently. Consequently, the probability of occurrence of ultraviolet rays with frequencies of 147 nm and 172 nm increases, thus leading to an increase in luminance. In addition, it is also possible to prevent the ion bombardment from disturbing the crystal structure and scattering the Ba and Eu ions.

Consequently, in a plasma display panel, the electrical discharge voltage decreases and the luminance increases. It can also be said that in fluorescence particles, the crystals would have their ion bond strengthened and have their resistance against ion bombardment increased.

Example 3

The present inventors added the organometallic compound with its concentration varied to find its preferred concentration. The results are as follows.

In the first specific example described above, samples were prepared by mixing together 1.0 part by weight of fluorescence powder, 0.2 parts by weight of organometallic compound, and 2.0 parts by weight of xylene as a diluent. In this specific example, samples were prepared with the amount of the organometallic compound added varied between 0.05 and 5.0 parts by weight as shown in the following Table 3, and variations in the emission intensity of the fluorescence particle irradiated with a vacuum ultraviolet ray (with a wavelength of 147 nm) before and after the ion bombardment were estimated. For this experiment, a blue fluorescence $BaMgAl_{10}O_{17}$: Eu and Mg octylate were used as a fluorescence and an organometallic compound, respectively.

TABLE 3

| Sample No. | Fluorescence | Added in part by weight | Organo-metallic compound | Added in parts by weight | Number of metals | Number of carbons | Note |
|---|---|---|---|---|---|---|---|
| A37* | $BaMgAl_{10}O_{17}$:Eu | 1.0 | none | 0.00 | 1 | 0 | |
| A38 | $BaMgAl_{10}O_{17}$:Eu | 1.0 | Mg octylate | 0.05 | 1 | 24 | |
| A39 | $BaMgAl_{10}O_{17}$:Eu | 1.0 | Mg octylate | 0.10 | 1 | 24 | |
| A19 | $BaMgAl_{10}O_{17}$:Eu | 1.0 | Mg octylate | 0.20 | 1 | 24 | |
| A40 | $BaMgAl_{10}O_{17}$:Eu | 1.0 | Mg octylate | 0.30 | 1 | 24 | |
| A41 | $BaMgAl_{10}O_{17}$:Eu | 1.0 | Mg octylate | 0.50 | 1 | 24 | |
| A42 | $BaMgAl_{10}O_{17}$:Eu | 1.0 | Mg octylate | 1.00 | 1 | 24 | |
| A43 | $BaMgAl_{10}O_{17}$:Eu | 1.0 | Mg octylate | 2.00 | 1 | 24 | |

*Comparative Example (A37)

Figure 19:
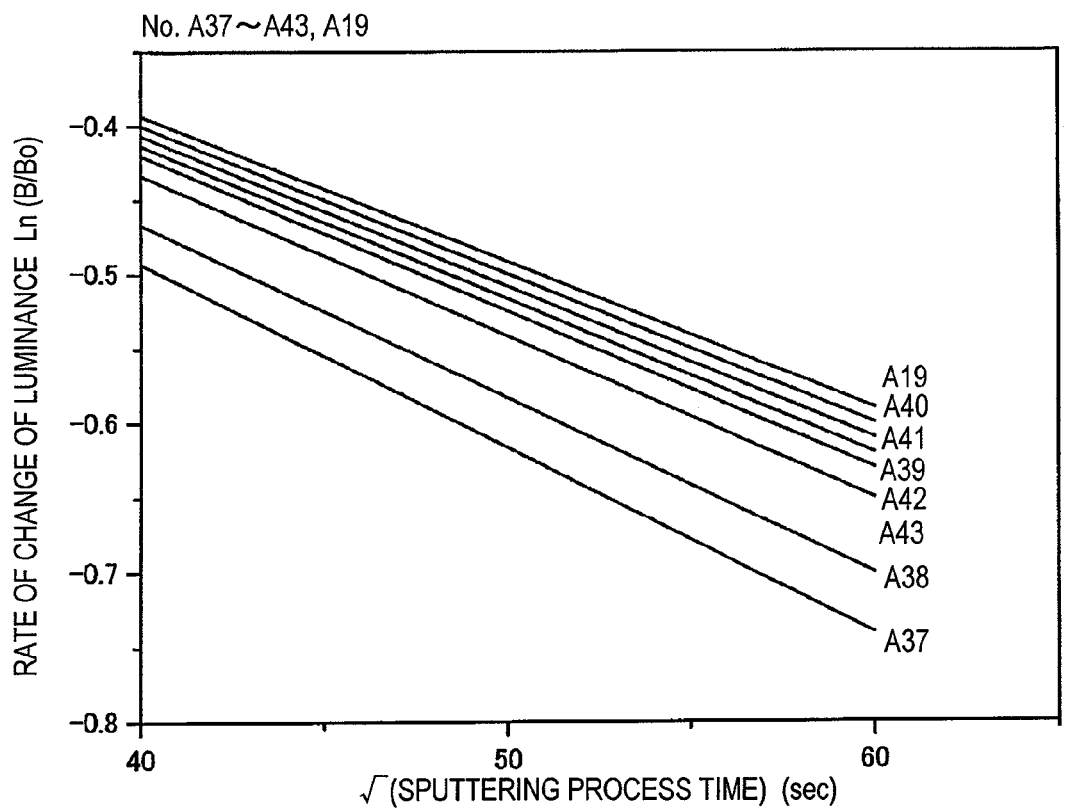
FIG. 19 shows how the rate of change of luminance varied with the ion sputtering process time when fluorescence particles representing specific examples of the present invention and comparative examples were subjected to the ion sputtering process.

As in the first specific example described above, to assess the damage caused by the collision of ions simply, an Ar ion sputtering apparatus was used to irradiate the fluorescence particles with Ar ions with an accelerating voltage of 100 V. FIG. 19 shows variations in emission intensity that were measured using the samples shown in Table 3. In FIG. 19, the abscissa represents the duration of ion bombardment (ion sputtering process time), while the ordinate represents the rate of change of the luminance of the sample from its initial value. On the other hand, FIG. 20 shows the relation between the amount of the organometallic compound added and the initial value of the emission intensity.

As can be seen from FIG. 19, compared to Sample A37 to which no organometallic compound was added, the rates of change of the luminance decreased, and their resistance against ion bombardment increased, in all of Samples A19 and A38 to A43. That is to say, the effect of increasing the ion bombardment resistance was achieved in every sample, of which the amount of the organometallic compound added fell within the range of 0.05 parts by weight through 2.0 parts by weight.

Figure 20:
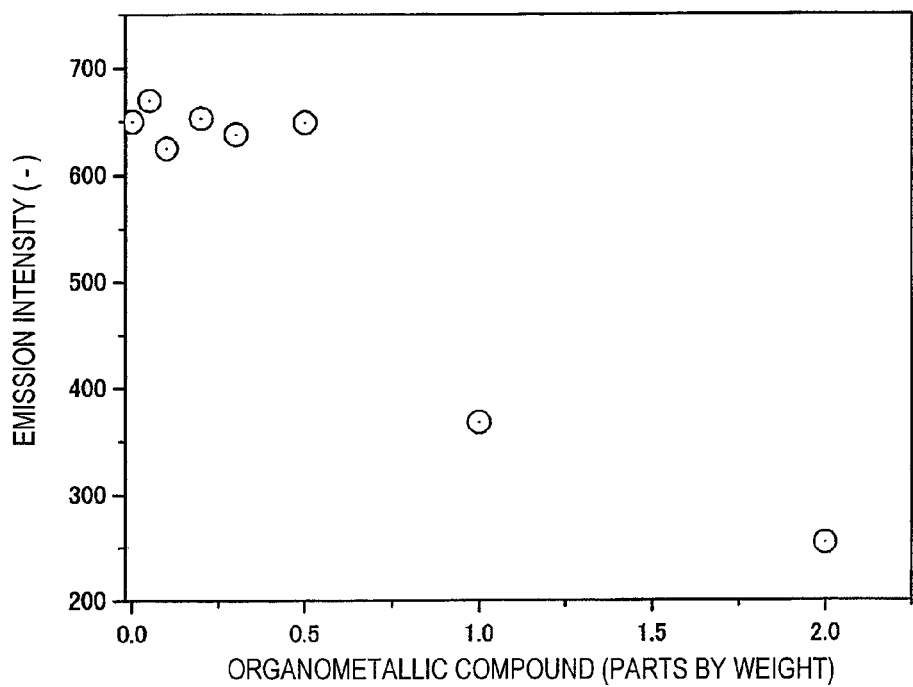
FIG. 20 shows how the emission intensity changed with the concentration of an organometallic compound in a specific example of the present invention.

However, as can be seen from FIG. 20, if the amount of the organometallic compound added exceeds 1.0 part by weight, the initial value of the emission intensity decreases. This is probably because extra metallic atoms, which have not diffused inside the fluorescence particle due to the excessive amount of the organometallic compound added, would stay on the surface of the fluorescence particle and would get oxidized during the heat treatment process to form a metal oxide layer on the surface of the fluorescence particle. Even so, the ion bombardment resistance can still be increased effectively. That is why if the amount of the organometallic compound added is greater than 1.0 part by weight and if a metal oxide layer has been formed on the surface of the fluorescence particle after the heat treatment, then the decrease in the initial value of the emission intensity can be minimized by removing such a metal oxide layer with an appropriate etchant. As a result, a fluorescence particle, which has a high initial emission intensity and also has increased ion bombardment resistance, can be obtained.

When the electron density distributions of Samples A38 and A41 were analyzed by MEM analysis, it was confirmed that the electron density was kept high in the vicinity of the center of fluorescenceescence as in the first specific example described above.

Figure 21:
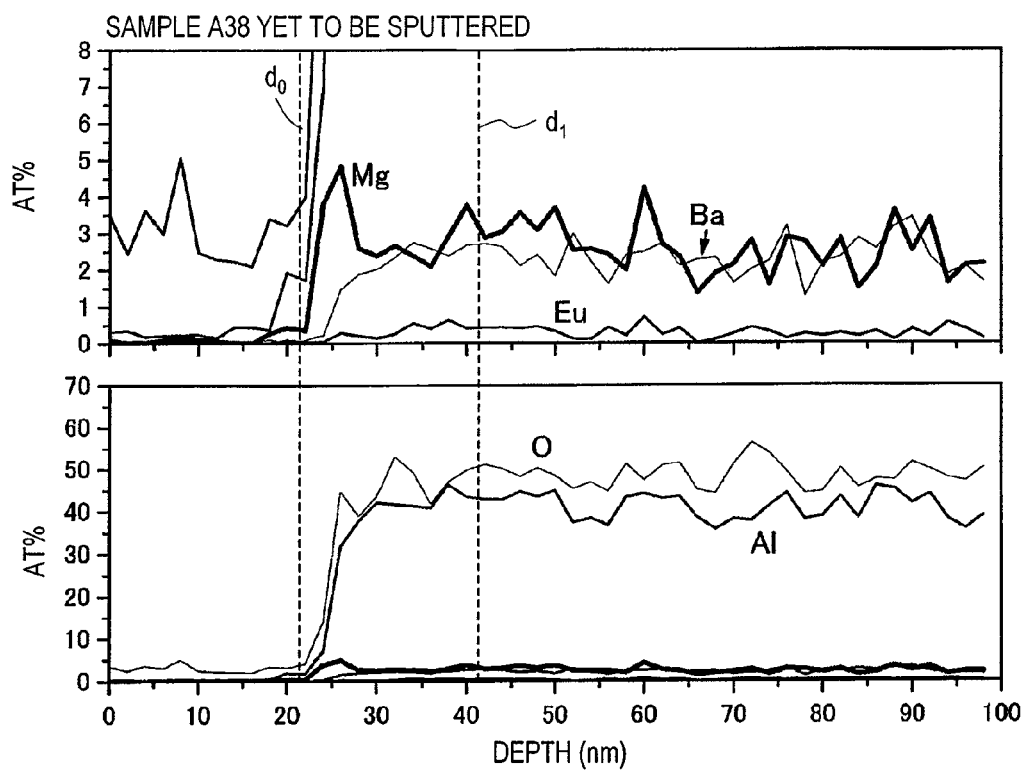
FIG. 21 shows the results of a TEM-EDS line analysis that was carried out on a fluorescence particle representing a specific example of the present invention before it was subjected to the ion sputtering process.

FIG. 21 shows the results of TEM-EDS line analysis on Sample A38. As can be seen easily from FIG. 21, the maximum value of the Mg concentration profile is located within the range from the surface of the fluorescence particle through the depth of 20 nm.

Example 4

Using Al ethylacetoacetate diisopropylate and Mg octylate that were used to prepare Samples A1 and A19, the properties of other fluorescences were evaluated. Various combinations of the fluorescences and organometallic compounds used are shown in the following Table 4:

that were actually measured on Samples A44, A45 and A46 and Samples A51, A52 and A53 shown in Table 3.

The rates of change of the luminances of Samples A44, A45 and A46 that were subjected to the organometallic process as in the first specific example described above were less steep than those of Samples A51, A52 and A53 that were not subjected to the organometallic process. Thus, it was confirmed that their ion bombardment resistance increased.

Meanwhile, as for Samples A47 and A48 that are made of the same $Zn_2SiO_4$: Mn based green fluorescence, the rates of change of their luminances were not far less steep than that of Sample A54 and their ion bombardment resistance did not increase so significantly. This is probably because the $Zn_2SiO_4$: Mn based fluorescence would have low ion bombardment resistance by nature even in a perfectly crystalline state. When the fluorescences were analyzed by SEM, an amorphous fluorescence layer was found on the surface of the ion-sputtered fluorescences, no matter whether the fluorescences were subjected to the organometallic process or not. Such an amorphous fluorescence layer would cut off an ultraviolet ray.

Also, the rates of change of the luminances of Samples A49 and A50 made of red fluorescences were slightly lower than those of Samples A55 and A56. This is probably because the red fluorescences have a higher degree of crystallinity than

TABLE 4

| Sample No. | Fluorescence | Added in part by weight | Organo-metallic compound | Added in parts by weight | Number of metals | Number of carbons | Note |
|---|---|---|---|---|---|---|---|
| A44 | (Y, Gd)BO$_3$:Tb | 1.0 | Al ethylacetoacetate diisopropylate | 0.20 | 1 | 12 | |
| A45 | LaPO$_4$:Ce,Tb | 1.0 | Al ethylacetoacetate diisopropylate | 0.20 | 1 | 12 | |
| A46 | BaMg$_2$Al$_{14}$O$_{24}$:Eu,Mn | 1.0 | Al ethylacetoacetate diisopropylate | 0.20 | 1 | 12 | |
| A47 | Zn$_2$SiO$_4$:Mn | 1.0 | Al ethylacetoacetate diisopropylate | 0.20 | 1 | 12 | |
| A48 | Zn$_2$SiO$_4$:Mn | 1.0 | Mg octylate | 0.20 | 1 | 24 | |
| A49 | YBO$_3$:Eu | 1.0 | Al ethylacetoacetate diisopropylate | 0.20 | 1 | 12 | |
| A50 | (Y, Gd)BO$_3$:Eu | 1.0 | Al ethylacetoacetate diisopropylate | 0.20 | 1 | 12 | |
| A51* | (Y, Gd)BO$_3$:Tb | 1.0 | None | 0.00 | 0 | 0 | |
| A52* | LaPO$_4$:Ce,Tb | 1.0 | None | 0.00 | 0 | 0 | |
| A53* | BaMg$_2$Al$_{14}$O$_{24}$:Eu,Mn | 1.0 | None | 0.00 | 0 | 0 | |
| A54* | Zn$_2$SiO$_4$:Mn | 1.0 | None | 0.00 | 0 | 0 | |
| A55* | YBO$_3$:Eu | 1.0 | None | 0.00 | 0 | 0 | |
| A56* | (Y, Gd)BO$_3$:Eu | 1.0 | None | 0.00 | 0 | 0 | |

*Comparative Example (A51 through A56)

Figure 22:
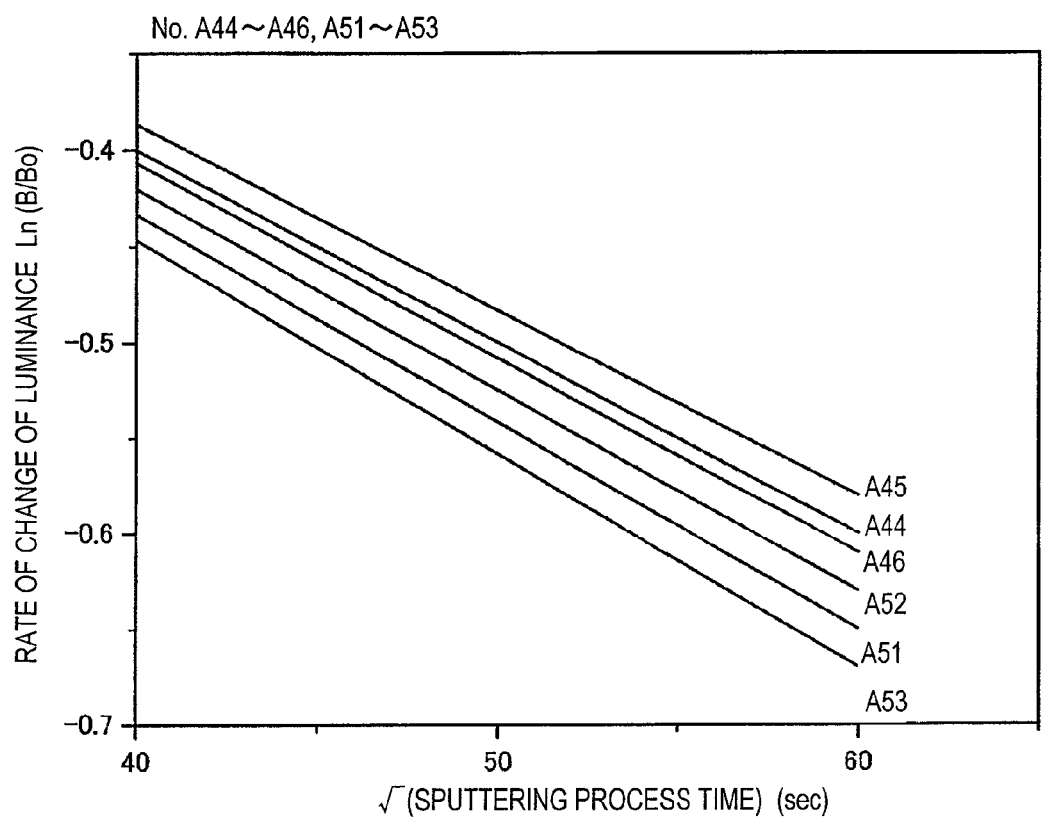
FIG. 22 shows how the rate of change of luminance varied with the ion sputtering process time when fluorescence particles representing specific examples of the present invention and comparative examples were subjected to the ion sputtering process.

As shown in Table 4, similar experiments were carried out on retailed (Y, Gd)BO$_3$: Tb, LaPO$_4$: Ce, Tb, BaMg$_2$Al$_{14}$O$_{24}$: Eu, Mn and Zn$_2$SiO$_4$: Mn based green fluorescences and on retailed YBO$_3$: Eu and (Y, Gd)BO$_3$: Eu based red fluorescences. Specifically, as in the first specific example described above, samples were prepared as combinations of the fluorescent materials and organometallic compounds shown in Table 4, and the variations in the emission intensity of the fluorescences irradiated with an ultraviolet ray (with a wavelength of 147 nm) before and after the ion bombardment were estimated. FIG. 22 shows the variations in emission intensity the other blue or green fluorescences, would have high ion bombardment resistance by nature, and would not produce so significant an effect even when subjected to the organometallic process. Nevertheless, their ion bombardment resistance did not decrease, either.

These results revealed that if the green and red fluorescences were subjected to the organometallic process, their ion bombardment resistance did increase, although the effects were achieved to slightly different degrees. And it was also discovered that as for the green and red fluorescences, the magnitude of the increase in ion bombardment resistance varied according to the composition.

Example 5

As in the second specific example described above, a plasma display panel was also fabricated using the fluorescence particles of the present invention with the concentrations of the organometallic compounds to add varied.

Although 1.0 part by weight of fluorescence particles, 0.2 parts by weight of organometallic compound, and 2.0 parts by weight of xylene as a diluent were mixed together in the second specific example of the present invention described above, a panel of this specific example was fabricated as in the second specific example with the amounts of the organometallic compound to add changed between 0.05 and 5.0 parts by weight. Then, the electrical discharge voltage of the panel thus fabricated, the luminance of an all white image when the panel was driven with a drive voltage of 185 V and a frequency of 100 kHz, and the rate of change of the luminance of the all white image when the panel was driven under such conditions for 1,000 hours were estimated. The results are shown in the following Table 5:

excessive element that failed to enter the crystal lattice, and the vacuum ultraviolet ray would have been absorbed into the fluorescence to decrease the initial emission intensity of the fluorescence.

Nevertheless, this coating film of MgO grew epitaxially and therefore it was confirmed that a good number of electrons were emitted.

Taking these results into account, the amount of the organometallic compound to add preferably falls within the range of 0.05 through 3.0 parts by weight, more preferably within the range of 0.05 through 1.0 part by weight, with respect to one part by weight of fluorescence. As already described for the fourth specific example, if the amount of the organometallic compound added is within the range of 1.0 through 3.0 parts by weight and if the decrease in the initial value of the emission intensity will cause a problem, then a layer of MgO or any other compound that has been produced on the surface is preferably removed by an etching process, for example, after the fluorescence has been subjected to an organometallic process.

When the electron density distributions of Samples B27 and B28 were analyzed by MEM analysis, it was confirmed

TABLE 5

| | Fluorescence | | | | | | | Evaluation | | | |
|---|---|---|---|---|---|---|---|---|---|---|---|
| | | | | Added in part by weight | Organometallic compound | | | Discharge voltage (V) | Luminance (cd/cm$^2$) | Luminance ratio (No. 25) | Luminance variation(%) in 1,000 hours |
| Sample No. | R (red) | G (green) | B (blue) | | Organometallic compound and its amount | Number of metals | Number of carbons | | | | |
| B26* | (Y, Gd)BO$_3$:Eu | (Y, Gd)BO$_3$:Tb | BaMgAl$_{10}$O$_{17}$:Eu | 1 | None (0) | 0 | 0 | 230 | 670 | 1.00 | −9.30 |
| B27* | (Y, Gd)BO$_3$:Eu | (Y, Gd)BO$_3$:Tb | BaMgAl$_{10}$O$_{17}$:Eu | 1 | Mg octylate (0.05) | 1 | 24 | 191 | 1508 | 2.25 | −3.10 |
| B28 | (Y, Gd)BO$_3$:Eu | (Y, Gd)BO$_3$:Tb | BaMgAl$_{10}$O$_{17}$:Eu | 1 | Mg octylate (0.10) | 1 | 24 | 185 | 1492 | 2.22 | −2.50 |
| B29 | (Y, Gd)BO$_3$:Eu | (Y, Gd)BO$_3$:Tb | BaMgAl$_{10}$O$_{17}$:Eu | 1 | Mg octylate (0.20) | 1 | 24 | 180 | 1506 | 2.25 | −1.50 |
| B30 | (Y, Gd)BO$_3$:Eu | (Y, Gd)BO$_3$:Tb | BaMgAl$_{10}$O$_{17}$:Eu | 1 | Mg octylate (0.30) | 1 | 24 | 176 | 1532 | 2.29 | −1.10 |
| B31 | (Y, Gd)BO$_3$:Eu | (Y, Gd)BO$_3$:Tb | BaMgAl$_{10}$O$_{17}$:Eu | 1 | Mg octylate (0.50) | 1 | 24 | 173 | 1446 | 2.11 | −0.80 |
| B32 | (Y, Gd)BO$_3$:Eu | (Y, Gd)BO$_3$:Tb | BaMgAl$_{10}$O$_{17}$:Eu | 1 | Mg octylate (1.00) | 1 | 24 | 172 | 1186 | 1.77 | −0.70 |
| B33 | (Y, Gd)BO$_3$:Eu | (Y, Gd)BO$_3$:Tb | BaMgAl$_{10}$O$_{17}$:Eu | 1 | Mg octylate (2.00) | 1 | 24 | 176 | 985 | 1.47 | −0.60 |
| B34 | (Y, Gd)BO$_3$:Eu | (Y, Gd)BO$_3$:Tb | BaMgAl$_{10}$O$_{17}$:Eu | 1 | Mg octylate (3.00) | 1 | 24 | 176 | 885 | 1.32 | −1.00 |
| B35* | (Y, Gd)BO$_3$:Eu | (Y, Gd)BO$_3$:Tb | BaMgAl$_{10}$O$_{17}$:Eu | 1 | Mg octylate (5.00) | 1 | 24 | 176 | 668 | 1.00 | −1.50 |

*Comparative example (B26 and B35)

The fluorescences used for the experiments were a blue fluorescence BaMgAl$_{10}$O$_{17}$: Eu, a green fluorescence (Y, Gd)BO$_3$: Tb, and a red fluorescence (Y, Gd)BO$_3$: Eu, and Mg octylate was used as an organometallic compound. Using these materials, Samples B26 through B35 were made.

As can be seen from Table 5, judging by the variation in the luminance of the all white image (i.e., the variation in luminance in 1,000 hours), the luminance increased in the entire range of 0.05 through 5.0 parts by weight. At the initial luminance of the panel, however, the luminance of Sample B35 (five parts by weight) decreased significantly (e.g., to a half or less of that of Sample B27). Such a significant decrease would have been produced probably because when the amount of the organometallic compound added to the diluent exceeded approximately 1.0 part by weight, the surface of the fluorescence would have been coated with an MgO film of an that the electron density was kept as high around the center of fluorescenceescence as in Sample B4 described above.

Figure 23:
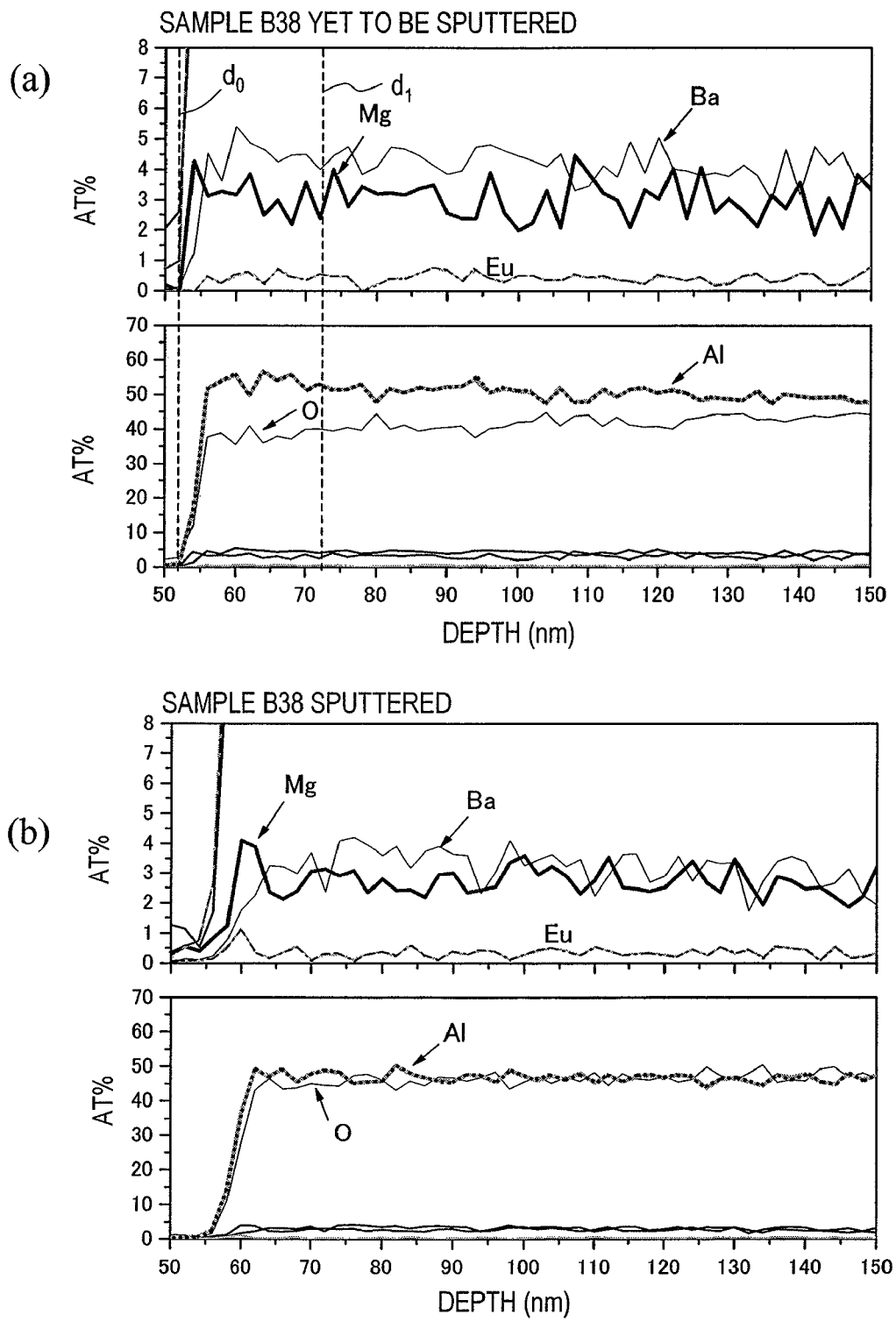
FIGS. 23(a) and 23(b) show the results of a TEM-EDS line analysis that was carried out on a fluorescence particle representing another specific example of the present invention before and after the ion sputtering process.

FIGS. 23(a) and 23(b) show the results of TEM-EDS line analysis that was carried out on Sample B27. It was confirmed that Sample B27 also had an outstanding peak of Mg concentration within the range from the surface of the fluorescence particle through the depth of 20 nm just like Sample B4.

As described above, the present inventors discovered that according to the present invention, the ion bombardment resistance could be increased by diffusing a metal through the surface of a fluorescence particle. This is probably because in a fluorescence particle subjected to an organometallic process, as a constituent element of the organometallic compound diffuses inward through the surface of the particle, the ion bond of crystals can be further strengthened, its ion bombardment resistance (ion sputtering resistance) can be increased, and the electron density can also be increased around the center of fluorescenceescence, thus exciting the fluorescence particle and causing it to produce fluorescenceescence easily. Consequently, the fluorescence particle of the present invention exhibits distinct properties that have never been realized by any conventional fluorescence, of which the surface is physically coated with a metal oxide in an aqueous solution or an alcohol solution.

INDUSTRIAL APPLICABILITY

The fluorescence particle of the present invention can produce fluorescenceescence with high luminance with the deterioration of the fluorescence minimized. This fluorescence particle can be used effectively in various types of plasma display panels and field emission displays.

In addition, the plasma display panel of the present invention can decrease the electrical discharge voltage, can increase the luminance, and can minimize the decrease in luminance, thus realizing a high-definition plasma display panel with low power dissipation.

On top of that, the fluorescence particle of the present invention can also be used effectively in fluorescent lamps and backlights for LCDs, thus realizing fluorescent lamps and backlights with high luminance and with minimal decrease in luminance.

The invention claimed is:

1. A plasma display panel comprising:
a front panel, which includes a transparent substrate and display electrodes that are arranged in stripes on the transparent substrate; and
a rear panel, which includes a supporting substrate, address electrodes that are arranged in stripes on the supporting substrate, a number of barrier ribs that are arranged on the supporting substrate to be located at least between the address electrodes, and a fluorescence layer that is arranged so as to cover the address electrodes between the barrier ribs,
wherein the front and rear panels are arranged to face each other such that the address electrodes and the display electrodes cross each other substantially at right angles and an electrical discharge gas is confined within a space between the barrier ribs, and
wherein the fluorescence layer includes a fluorescence particle for use in a light emitting display device, the particle being made of a fluorescent material,
wherein the fluorescent material has at least one element selected from the group consisting of Al, Mg, Ca, Ba, Sr and Y, and
wherein within a range from the surface of the fluorescence particle through a depth of 20 nm, the at least one element has a maximum value of its concentration profile in the depth direction.

2. The plasma display panel of claim 1, wherein in the fluorescence layer, the surface of the light emitting display device fluorescence particle is exposed.

3. The plasma display panel of claim 1, wherein the electrical discharge gas includes at least 15 vol % of xenon gas.

4. A method of making a light emitting display device fluorescence particle, the method comprising the steps of:
preparing a fluorescence particle made of a fluorescent material;
(A) immersing the fluorescence particle in a solution that has a non-water-soluble organometallic compound, including at least one element selected from the group consisting of Al, Mg, Ca, Ba, Sr and Y, and a non-aqueous solvent;
(B) removing the non-aqueous solvent to obtain a fluorescence particle that has had the non-water-soluble organometallic compound deposited thereon; and
(C) thermally treating the fluorescence particle on which the non-water-soluble organometallic compound has been deposited.

5. The method of claim 4, wherein the non-water-soluble organometallic compound is at least one compound selected from the group consisting of metal salts of aliphatic acid, metal salts of acetylacetone, metal salts of unsaturated carboxylic acid, metallocene compounds, and β-diketone.

6. The method of claim 4, wherein the step (C) includes heating the fluorescence particle, on which the non-water-soluble organometallic compound has been deposited, to a temperature of 500° C. to 650° C.

7. The method of claim 4, wherein the fluorescent material includes at least one of $(Ba, Sr)MgAl_{10}O_{17}$: Eu, $SrMg(SiO_2)$: Eu, $Sr_2MgSi_2O_7$: Eu, $CaMgSi_2O_6$: Eu and $SrMgSi_2O_6$: Eu.

8. The method of claim 4, wherein the fluorescent material includes at least one of $(Y, Gd)BO_3$: Tb, $LaPO_4$: Ce, Tb, $BaMg_2Al_{14}O_{24}$: Eu, Mn, $BaAl_{12}O_{19}$: Mn, and $Zn_2SiO_4$: Mn.

9. The method of claim 4, wherein the fluorescent material includes at least one of $Y(P, V)O_4$: Eu, $Y_2O_3$: Eu, $(Y, Gd)_2O_3$: Eu, and $(Y, Gd)BO_3$: Eu.

10. A fluorescence particle for use in a light emitting display device, the particle being made of a fluorescent material,
wherein the fluorescent material has at least one element selected from the group consisting of Al, Mg, Ca, Ba, Sr and Y, and
wherein within a range from the surface of the fluorescence particle through a depth of 20 nm, the at least one element has a maximum value of its concentration profile in the depth direction, and
wherein the fluorescent material includes at least one of $(Ba, Sr)MgAl_{10}O_{17}$: Eu, $SrMg(SiO_2)$: Eu, $Sr_2MgSi_2O_7$: Eu, $CaMgSi_2O_6$: Eu and $SrMgSi_2O_6$: Eu.

11. The light emitting display device fluorescence particle of claim 10, wherein the average concentration of the at least one element within the range from the surface of the fluorescence particle through the depth of 20 nm is at least higher than, but at most three times as high as, its average concentration over the entire fluorescence particle.

12. The light emitting display device fluorescence particle of claim 11, wherein every constituent element of the fluorescent material but the at least one element is distributed substantially uniformly in the fluorescence particle.

13. The light emitting display device fluorescence particle of claim 12, wherein the average concentration of the at least one element in the range from the surface of the fluorescence particle through the depth of 20 nm has been increased by diffusing the at least one element inward from the surface of the fluorescence particle.

14. A fluorescence particle for use in a light emitting display device, the particle being made of a fluorescent material,
wherein the fluorescent material has at least one element selected from the group consisting of Al, Mg, Ca, Ba, Sr and Y, and
wherein within a range from the surface of the fluorescence particle through a depth of 20 nm, the at least one element has a maximum value of its concentration profile in the depth direction, and
wherein the fluorescent material includes at least one of $(Y, Gd)BO_3$: Tb, $LaPO_4$: Ce, Tb, $BaMg_2Al_{14}O_{24}$: Eu, Mn, $BaAl_{12}O_{19}$: Mn, and $Zn_2SiO_4$: Mn.

15. A fluorescence particle for use in a light emitting display device, the particle being made of a fluorescent material, wherein the fluorescent material has at least one element selected from the group consisting of Al, Mg, Ca, Ba, Sr and Y, and wherein within a range from the surface of the fluorescence particle through a depth of 20 nm, the at least one element has a maximum value of its concentration profile in the depth direction, and wherein the fluorescent material includes at least one of $Y(P, V)O_4$: Eu, $Y_2O_3$: Eu, $(Y, Gd)_2O_3$: Eu, and $(Y, Gd)BO_3$: Eu.

* * * * *